United States Patent
Russell

(10) Patent No.: US 11,172,190 B2
(45) Date of Patent: Nov. 9, 2021

(54) STEREO WEAVING FOR HEAD-TRACKED AUTOSTEREOSCOPIC DISPLAYS

(71) Applicant: GOOGLE LLC, Mountain View, CA (US)

(72) Inventor: Andrew Ian Russell, Weston, FL (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 16/249,551

(22) Filed: Jan. 16, 2019

(65) Prior Publication Data

US 2020/0021796 A1    Jan. 16, 2020

Related U.S. Application Data

(60) Provisional application No. 62/696,158, filed on Jul. 10, 2018.

(51) Int. Cl.
| | |
|---|---|
| *H04N 13/305* | (2018.01) |
| *H04N 13/317* | (2018.01) |
| *H04N 13/324* | (2018.01) |
| *H04N 13/383* | (2018.01) |
| *G06F 9/30* | (2018.01) |
| *G06F 3/0481* | (2013.01) |
| *G06F 3/01* | (2006.01) |

(52) U.S. Cl.
CPC ........... *H04N 13/383* (2018.05); *G06F 3/012* (2013.01); *G06F 3/013* (2013.01); *G06F 3/04815* (2013.01); *G06F 9/3004* (2013.01)

(58) Field of Classification Search
CPC .... H04N 13/30; H04N 13/305; H04N 13/317; H04N 13/324; H04N 13/376; H04N 13/383; G06F 3/012; G06F 3/013; G06F 3/04815; G06F 9/3004
See application file for complete search history.

(56) References Cited

U.S. PATENT DOCUMENTS

| | | | |
|---|---|---|---|
| 9,661,300 B2 | 5/2017 | Li | |
| 2013/0057644 A1* | 3/2013 | Stefanoski | G06T 5/50 348/42 |
| 2014/0071253 A1* | 3/2014 | de la Barre | H04N 13/305 348/51 |
| 2017/0085867 A1* | 3/2017 | Baran | B41M 3/008 |
| 2017/0127037 A1* | 5/2017 | Kugler | H04N 13/324 |
| 2017/0230647 A1* | 8/2017 | Han | H04N 13/305 |
| 2019/0166359 A1* | 5/2019 | Lapstun | H04N 13/232 |

FOREIGN PATENT DOCUMENTS

EP    2835974 A1    2/2015

OTHER PUBLICATIONS

International Search Report and Written Opinion for Application No. PCT/US2019/040810, dated Oct. 21, 2019, 19 pages.

* cited by examiner

*Primary Examiner* — Patrick E Demosky
(74) *Attorney, Agent, or Firm* — Brake Hughes Bellermann LLP

(57) ABSTRACT

Systems and methods are described for determining a tracked position associated with viewing an emitting interface of a display device, generating, using the tracked position, a first mask representing a first set of values associated with the emitting interface of the display device, generating, using the tracked position, a second mask representing a second set of values associated with the emitting interface of the display device, and generating an output image using the first mask and the second mask.

20 Claims, 19 Drawing Sheets

STEREO WEAVING FOR HEAD-TRACKED AUTOSTEREOSCOPIC DISPLAYS

CROSS REFERENCE TO RELATED APPLICATION

This application claims priority to U.S. Provisional Application No. 62/696,158, filed on Jul. 10, 2018, the disclosure of which is incorporated herein by reference in its entirety.

TECHNICAL FIELD

This description generally relates to methods, devices, and algorithms used in generating content for presentation on autostereoscopic displays.

BACKGROUND

Experiencing traditional three-dimensional (3D) content may include accessing a head-mounted display (HMD) device to properly view and interact with such content. Particular optics may be calculated and manufactured for the HMD device in order to provide realistic 3D imagery for display. However, the use of HMD devices can be cumbersome for a user to continually wear. Accordingly, the user may utilize autostereoscopic displays to access user experiences with 3D perception without requiring the use of the HMD device (e.g., eyewear or headgear). The autostereoscopic displays employ optical components to achieve a 3D effect for a variety of different images on the same plane and providing such images from a number of points of view to produce the illusion of 3D space.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, systems and methods are described for determining a tracked position associated with viewing an emitting interface of a display device, generating, using the tracked position, a first mask representing a first set of values associated with the emitting interface of the display device, generating, using the tracked position, a second mask representing a second set of values associated with the emitting interface of the display device, and generating an output image using the first mask and the second mask.

Generating the output image may include obtaining a left image with a first set of pixels and a right image with a second set of pixels, assigning the first set of values to the first set of pixels in the left image, assigning the second set of values to the second set of pixels in the right image, and interleaving the left image with the right image according to the assigned first set of values and the assigned second set of values.

The systems and methods may include and/or make use of a tracking module, a display panel coupled to a lenticular lens array, and at least one processing device with access to memory storing instructions executable by the system.

Implementations may include one or more of the following features. Implementations may include providing the output image to the display device. The output image may be configured to provide the left image to a left eye of a user viewing the emitting interface of the display device while simultaneously providing the right image to a right eye of the user viewing the emitting interface of the display device.

In some implementations, the first mask and the second mask are derived from topographical four-dimensional surfaces and the first mask and the second mask are generated by applying a non-linear mapping to fractional portions of the surfaces. IN some implementations, the first mask represents a first subset of pixels for a detected head position of a user viewing the display device and the second mask represents a second subset of pixels for the detected head position of the user. In some implementations, the first mask and the second mask are used to obtain, for a plurality of changeable head positions of the user, a value for each pixel associated with the display device.

In some implementations, the first mask and the second mask are color images having red, green, and blue color components. Each color component may be used to determine a respective color component of the output image. In some implementations, the tracked position is a head position of a user and wherein the first mask and the second mask are updated based on a detected movement of the head position. In some implementations, the first mask and the second mask include representations for at least one color index for each pixel of the display device. In some implementations, the tracked position varies for each row of the display device.

In some implementations, the tracked position is a head position of a user and the first mask and the second mask are updated based on a detected movement of the head position. In some implementations, the tracked position varies for each row of the display device. Other embodiments of this aspect include corresponding computer systems, apparatus, and computer programs recorded on one or more computer storage devices, each configured to perform the actions of the methods.

In another general aspect, a computer-implemented method is described. The method may include use of at least one processing device and memory storing instructions that when executed cause the processing device to perform operations including determining a tracked position associated with viewing an emitting interface of a display device, generating, using the tracked position, a first mask representing a first set of values associated with the emitting interface of the display device, generating, using the tracked position, a second mask representing a second set of values associated with the emitting interface of the display device, and generating an output image using the first mask and the second mask.

Generating the output image may include obtaining a left image with a first set of pixels and a right image with a second set of pixels, assigning the first set of values to the first set of pixels in the left image, assigning the second set of values to the second set of pixels in the right image, and interleaving the left image with the right image according to the assigned first set of values and the assigned second set of values.

Implementations may include one or more of the following features. In some implementations, the method may include providing the output image to the display device. The output image may be configured to provide the left image to a left eye of a user viewing the emitting interface of the display device while simultaneously providing the right image to a right eye. Other embodiments of this aspect include corresponding computer systems, apparatus, and computer programs recorded on one or more computer storage devices, each configured to perform the actions of the methods.

In some implementations, at least a portion of the first set of pixels is viewable from a first location and the first location is associated with a left eye of a user viewing the display device and at least a portion of the second set of pixels is viewable from a second location and the second location is associated with a right eye of the user viewing the display device.

In some implementations, the first mask and the second mask are derived from topographical four-dimensional surfaces with plotted lines representing locations of light projected through a plurality of lenticular lenses associated with the emitting interface of the display device. The first mask and the second mask may be generated by applying a non-linear mapping to fractional portions of the surfaces.

In some implementations, the first mask and the second mask are color images having red, green, and blue color components, each color component is used to determine a respective color component of the output image. In some implementations, the first mask and the second mask include representations for at least one color index for each pixel of the display device. Implementations of the described techniques may include hardware, a method or process, or computer software on a computer-accessible medium.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
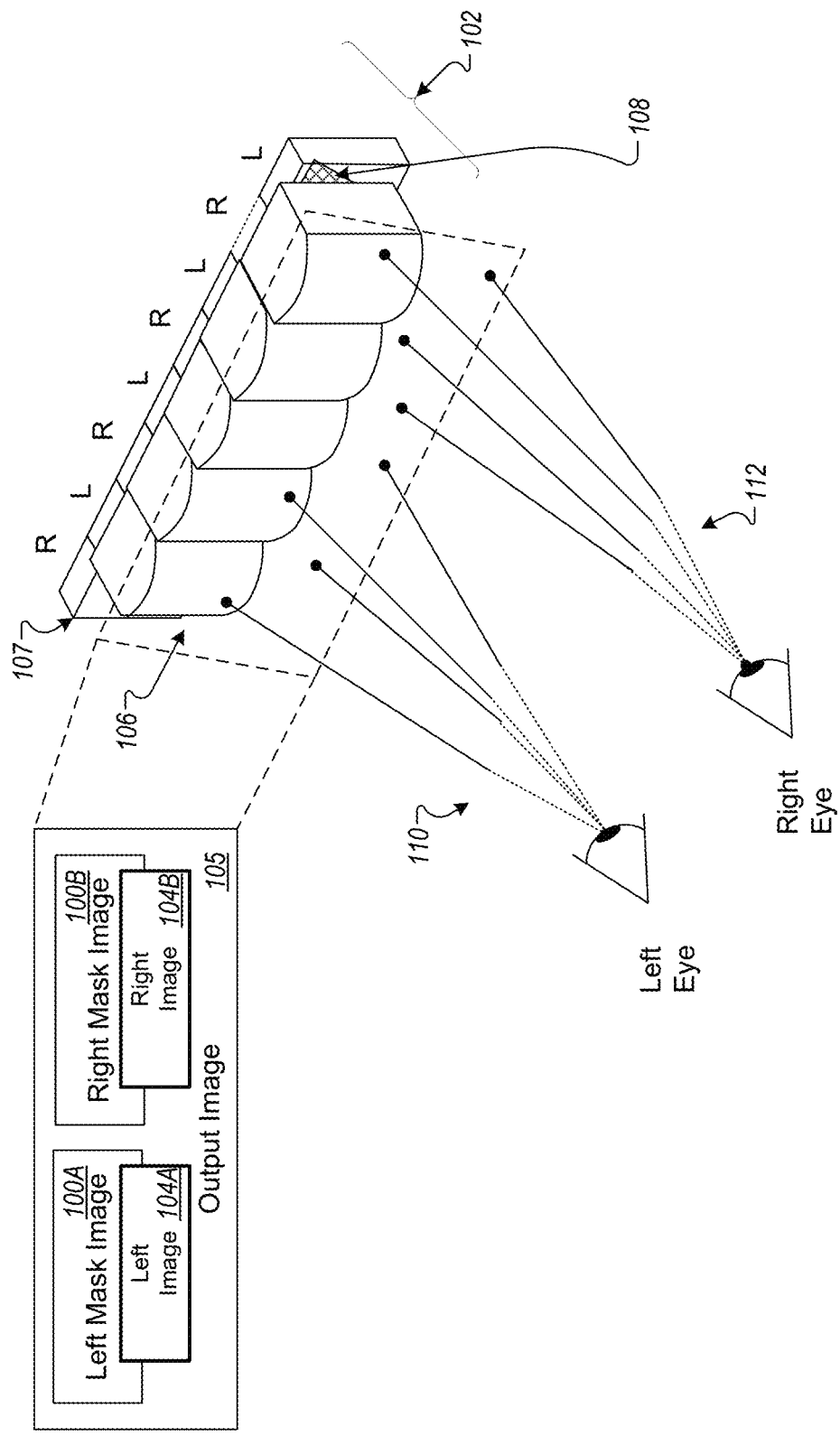
FIG. 1 is a block diagram illustrating an example output image providing stereo weaved content in a stereoscopic display, according to implementations described throughout this disclosure.

Autostereoscopic displays can provide imagery that approximates the three-dimensional (3D) optical characteristics of physical objects in the real world without requiring the use of a head-mounted display (HMD) device. In general, autostereoscopic displays include flat panel displays, lenticular lenses (e.g., microlens arrays), and/or parallax barriers to redirect images to a number of different viewing regions associated with the display.

In some example autostereoscopic displays, there may be a single location that provides a 3D view of image content provided by such displays. A user may be seated in the single location to experience proper parallax, little distortion, and realistic 3D images. If the user moves to a different physical location (or changes a head position or eye gaze position), the image content may begin to appear less realistic, 2D, and/or distorted. The systems and methods described herein may reconfigure the image content projected from the display to ensure that the user can move around, but still experience proper parallax, low rates of distortion, and realistic 3D images in real time. Thus, the systems and methods described herein provide the advantage of maintaining and providing 3D image content to a user regardless of user movement that occurs while the user is viewing the display.

The systems and methods described herein may assess how to display image content on an autostereoscopic display in response to detecting movement of the user accessing the display. For example, if the user (or head or eye of a user) moves left or right, the systems and methods described herein can detect such movements to determine how to display image content in a way that provides 3D depth, proper parallax, and 3D perception of the image content for the user (and for each eye of the user).

Determining how to display the image content may include generating a mask (e.g., subpixel mask image) that can be calculated for a left eye and a right eye of the user viewing image content on the display. In some implementations, a mask may represent an image stored in memory on a computing device. The mask may indicate which particular pixels or subpixels of a display are to be illuminated (and subpixels that are to be extinguished) to properly display 3D effects and image content to both a left eye and a right eye of the user viewing image content on the display. In short, the systems and methods described herein may generate, for an image, two masks for a user upon detection of a movement of the user. The first mask may be used to display image content meant for viewing by the left eye of the user while the second mask may be used to display image content meant for viewing by the right eye of the user.

In some implementations, the masks may be used to properly direct or redirect the image content for display to each eye of a user viewing the image content on the autostereoscopic display. For example, the systems described herein can track head position, eye movements, and/or body movements and use the tracked movements to generate masks (e.g., mask images) to adjust how the image content is provided for display on the display devices described throughout this disclosure.

In some implementations, generating the masks may include using a number of algorithms and techniques to determine which pixel portions in image content may be provided to each eye to ensure 3D effects. The masks can be used to combine a left-eye image (e.g., a left image) and a right-eye image (e.g., a right image) to produce an output image that may be provided to the display device. The output image may represent image content configured to be displayed to a left eye and a right eye, respectively.

The left image and the right image may be combined to generate an output image. Combining the left image with the right image may be described as stereo weaving (e.g., swizzling) of pixels using stereo weaving algorithms that utilize masks generated by mask generation algorithms. The systems and methods described herein may provide one or more stereo weaving algorithms configured to interleave pixels from a generated left image and pixels from a generated right image in a manner such that the left eye of the user views the left image while the right eye of the user views the right image.

In some implementations, the systems and methods described herein may use any number of stereo weaving algorithms to determine which set of pixels to assign as viewable within images being presented by the autostereoscopic displays. For example, a number of techniques described herein may be utilized to calculate masks (e.g., sub-pixel masks) that operate as eye-assignment functions to ensure each eye views a proper 3D version of an output image. For example, a left mask may be calculated and generated to represent a left eye-assignment function. Similarly, a right mask may be calculated and generated to represent a right eye-assignment function. The left mask and right mask may be used together to provide proper depth perception, 3D effects, and proper parallax for a particular set of images. Each generated mask may include a number of values assigned to each red, green, and blue (RGB) sub-pixel for a predefined display size (or display portion). The masks may be used to compute and generate an image for display to each eye of a user viewing the autostereoscopic display.

In general, the systems and methods described herein may utilize a number of techniques and algorithms adapted to configure image content for display on the autostereoscopic displays described throughout this disclosure to ensure that a user viewing such content experiences realistic 3D content with proper parallax and minimal distortion. For example, the systems and methods described herein may determine and/or calculate masks that function to assign output images for provision to each of a left eye and a right eye of the user based on determining a location of the user (or the location of the head or eyes of the user). In some implementations, the output images are provided with respect to a particular portion of pixels being provided by the display. In particular, the systems may determine that a left eye of a user (e.g., viewer) may view a first set of pixels in an output image while the right eye of the user may view a second set of pixels in the output image. Each set of pixels can be determined based on the location of the user with respect to the display (or with respect to pixel locations on the display).

FIG. 1 is a block diagram illustrating an example of using one or more masks 100 (e.g., mask 100A and mask 100B) to provide stereo weaved content in an autostereoscopic display assembly 102, according to implementations described throughout this disclosure. Stereo weaving content may refer to interleaving a left image 104A with a right image 104B to obtain an output image 105. The autostereoscopic display assembly 102 shown in FIG. 1 represents an assembled display that includes at least a high-resolution display panel 107 coupled to (e.g., bonded to) a lenticular array of lenses 106. In addition, the assembly 102 may include one or more glass spacers 108 seated between the lenticular array of lenses and the high-resolution display panel 107. In operation of display assembly 102, the array of lenses 106 (e.g., microlens array) and glass spacers 108 may be designed such that, at a particular viewing condition, the left eye of the user views a first subset of pixels associated with an image, as shown by viewing rays 110, while the right eye of the user views a mutually exclusive second subset of pixels, as shown by viewing rays 112.

Figure 9:
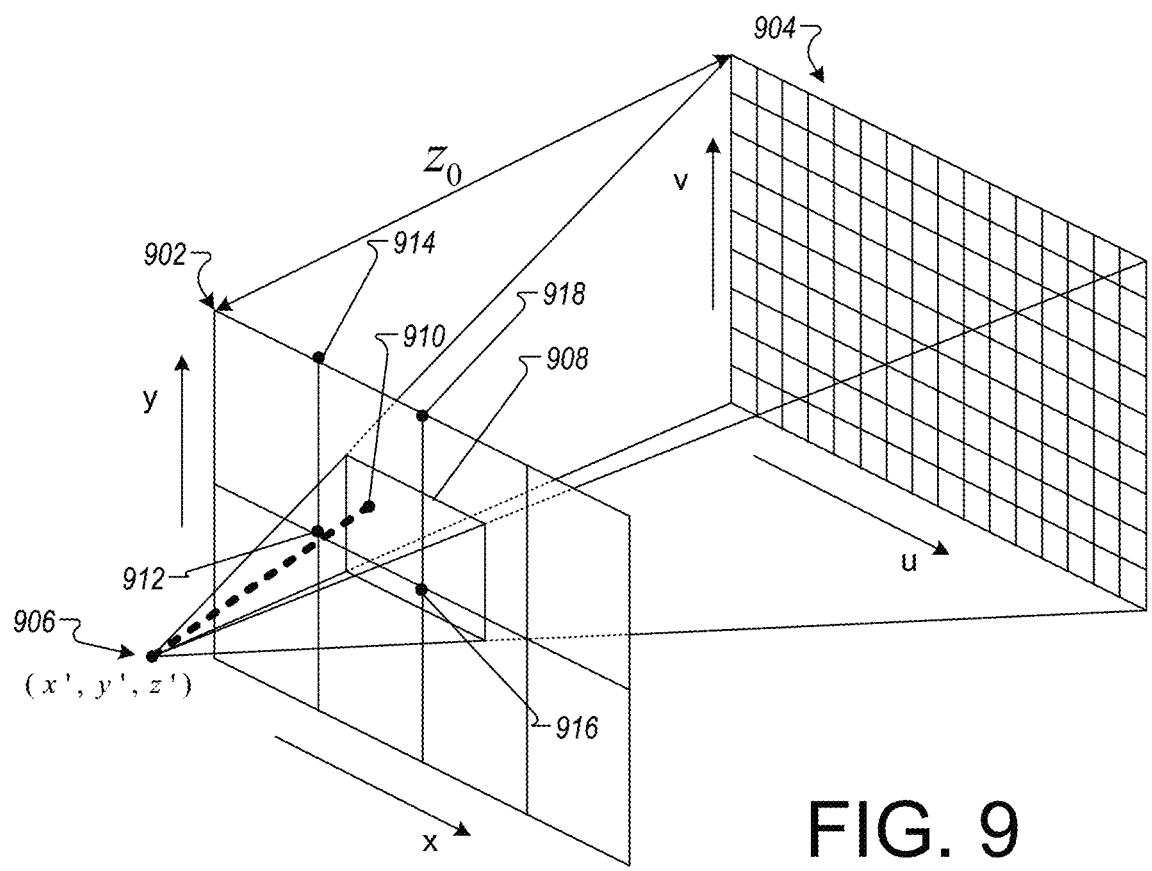
FIG. 9 is a diagram of an example grid and geometry representing a sampled four dimensional (4D) surface.

A mask may be calculated and generated for each of a left and right eye. The masks 100 may be different for each eye. For example, a mask 100A may be calculated for the left eye while a mask 100B may be calculated for the right eye. In some implementations, the mask 100A may be a shifted version of the mask 100B. That is, the mask 100A may be shifted in one or more of five dimensions of space (e.g., x, y, z, u, and v, as shown in FIG. 9, for example). In some implementations, the mask 100A may be determined using pixel values associated with the mask 100B. The masks 100 (e.g., mask 100A and/or mask 100B) may be notated for mathematical convenience throughout this disclosure as a single mask, m, where $m_R=m$, and $m_L=1-m$. Each mask 100A/100B may be represented in the (x-y-z) plane for correlation to the display assembly 102 in the (u-v) plane.

In some implementations, the mask 100 may include a single mask (mask image) m, which may be a two dimensional (2D) plane represented by a number of pixel values (with subpixel values as well). For example, each mask 100 (e.g., mask 100A for the left eye and mask 100B for the right eye) represents a surface s of computed subpixels with values assigned to each RGB subpixel within an image to be displayed from display assembly 102. For example, a mask for the right eye (e.g., $m_R$) may include subpixels that are defined as one (e.g., $m_R=1$) to indicate that a particular subpixel is visible to the right eye of the user. Similarly, if a mask for the left eye (e.g., $m_L$) includes subpixels that are defined as one (e.g., $m_L=1$), then those subpixels are visible to the left eye of the user.

In some implementations, an output image I (e.g., output image 105) may be computed by the systems described throughout this disclosure as a right mask $m_R$ (e.g., right mask image 100A) multiplied by a right image $I_R$ (e.g., right image 104B) combined with a left mask $m_L$ (e.g., left mask image 100A) multiplied by a left image $I_L$ (e.g., left image 104A) which is shown by the following equation: ($I=m_R I_R + m_L I_L$). Such a computation may be computed on a per-pixel, per-color basis. In addition, a constraint may be used in which the left mask $m_L$ combined with the right mask $m_R$ is equal to one (e.g., $m_R+m_L=1$).

In general, masks ($m_R$) 100B and ($m_L$) 100A and right image ($I_R$) 104B and left image ($I_L$) 104A may represent 2D images that include at least one component per color. An example notation for a mask image may include $m_R(u,v)$, where the mask for the right eye is represented $m_R$ and u and v represent the spatial coordinates in the plane of a screen of the display assembly 102, for example. A mask value may be computed for each pixel, m(u,v), based on weather the pixel is viewable by the left eye, (e.g., m=0) or the right eye (e.g., m=1).

The mask image, m(u,v) may depend on variables (x, y, z) representing a 3D location of the head of a user (e.g., viewing the display assembly 102). For example, the systems described herein may track a center point between two eyes of the user to be apprised of the user location and movement while viewing the assembly 102, for example. The tracked location may be represented as M(u, v, x, y, z), to show that a scalar value, (M), depends on at least the five variables, u, v, x, y and z. The scalar value, (M) may also depend on the color index, (c) where c={red, green, blue}. A lower-case (m) may represent the 2D function (as an image), while an uppercase (M) may represent the 5D function. Thus, m(u, v)=M(u, v, x, y, z), evaluated as some specific location x, y and z.

In some implementations, a color index may be computed for each mask image m(u, v) by determining, for each pixel in the mask, which of a red subpixel, a green subpixel, and a blue subpixel is to be made visible when displayed on the display. In general, each pixel of red, green, and blue subpixels may be sampled separately and independently of another pixel. In addition, a color index may be calculated for each eye of the user.

In some implementations, a location representing the user may be selected as a midpoint between the two eyes of the user to take advantage of the symmetry between the eyes of the user. Both the left-eye mask and the right-eye mask can be calculated from the midpoint. Alternatively, a mask for the left eye (or right eye) can be calculated and a mask for the right eye (or left eye) can be interpolated from that calculation.

Consistent with implementations described herein, the autostereoscopic display assembly 102 may be a glasses-free, lenticular, three-dimensional display that includes a plurality of microlenses. In some implementations, an array 106 may include microlenses in a microlens array. In some implementations, 3D imagery can be produced by projecting a portion (e.g., a first set of pixels) of a first image in a first direction through the at least one microlens (e.g., to a left eye of a user) and projecting a portion (e.g., a second set of pixels) of a second image in a second direction through the at least one other microlens (e.g., to a right eye of the user). The second image may be similar to the first image, but the second image may be shifted from the first image to simulate parallax to thereby simulating a 3D stereoscopic image for the user viewing the autostereoscopic display assembly 102.

Figure 2:
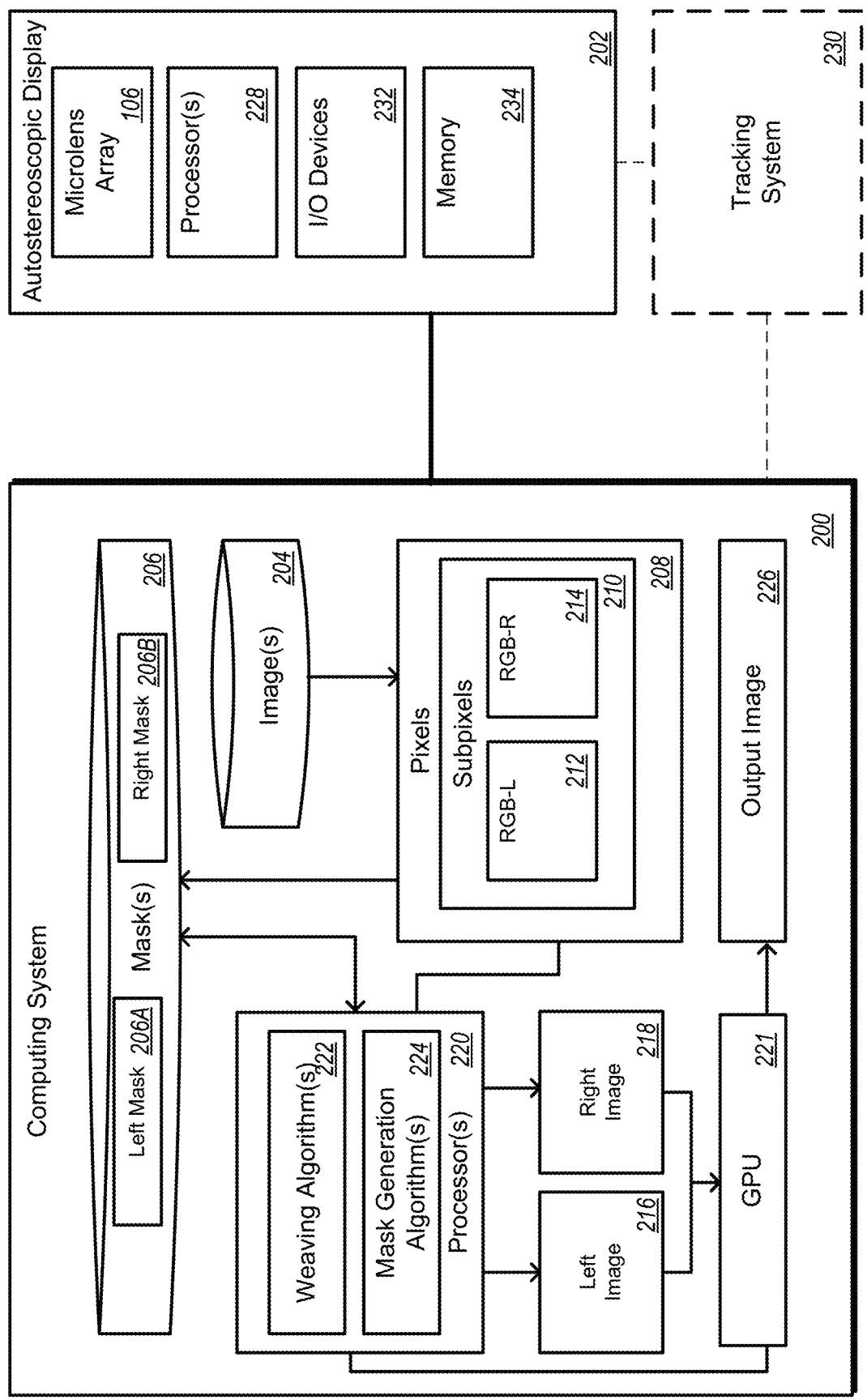
FIG. 2 is a block diagram of an example system for generating content for display in an autostereoscopic display device, according to implementations described throughout this disclosure.

FIG. 2 is a block diagram of an example system 200 for generating content for display in an autostereoscopic display device 202, according to implementations described throughout this disclosure. Although system 200 is shown separate from display 202, in some implementations, the system 200 may be included as part of display 202. In general, display 202 can include a high-resolution and glasses-free lenticular three-dimensional display. For example, display 202 can include a microlens array 106 that includes a plurality of lenses (e.g., microlenses) with a glass spacer coupled (e.g., bonded) to the microlenses of the display. The microlenses may be designed such that, from a selected viewing position, a left eye of a user of the display may view a first set of pixels while the right eye of the user may view a second set of pixels (e.g., where the second set of pixels is mutually exclusive to the first set of pixels).

In some implementations, the microlenses of the microlens array 106 can receive images 204 from the display 202, which can be analyzed according to content and a location of a user associated with viewing the display 202. The images 204 may be processed by system 200 into pixels 208 and subpixels 210 with particular RGB subpixels 212 for a left eye and RGB subpixels 214 for a right eye. The system 200 may use pixels 208 (and subpixels 210, 212, and 214) to generate a first image (e.g., a left image 216) that is configured for 3D stereoscopic view from a first location. Similarly, the system 200 may use pixels 208 (and subpixels 210, 212, and 214) to generate a second image (e.g., a right image 218) that is configured for 3D stereoscopic view from a second location. In some implementations, the first location may correspond to a location of the left eye of a user while the second location may correspond to a location of the right eye of the user. In some implementations, symmetry of the user can be utilized by performing calculations and assessments using an offset from a center of the eye location for the user. That is, the left image 216 may be calculated using an offset distance from a tracked location between the eyes of the user while the right image 218 may be calculated using the same offset distance in the opposite direction (i.e., toward the right eye) from the tracked location between the eyes of the user.

The system 200 can compute (and generate) masks 206 that represent a value assigned to each RGB sub-pixel (e.g., subpixels 212 and subpixels 214) corresponding to pixels in the display 202. Any number of processors 220 may utilize algorithms (e.g., weaving algorithms 222 and mask generation algorithms 224) to generate masks 206 and to use the masks 206 to interleave (e.g., swizzle) images together. For example, the masks 206 can be used to generate the left image 216 and the right image 218, as described throughout this disclosure. In particular, the system 200 can interleave (e.g., weave together) the left image 216 (for a left eye) and the right image 218 (for a right eye) using the masks 206 to produce a combined output image 226 for provision on the display 202.

The output image 226 represents a 3D stereoscopic image with proper parallax and viewing configuration for both eyes associated with the user accessing the display based at least in part on a tracked location of the head of the user. The output image 226 may be determined using system 200 each time the user moves a head position while viewing the display 202.

In some implementations, the processors may include (or communicate with) a graphics processing unit (GPU) 221. In operation, the processors 221 may include (or have access to memory, storage, and other processor (e.g., a CPU)). To facilitate graphics and image generation, the processors 221 may communicate with the GPU 221 to display images on the display device 202. The CPU (e.g., processors 220) and the GPU 221 may be connected through a high speed bus, such as PCI, AGP or PCI-Express. The GPU 221 may be connected to the display 202 through another high speed interface such as HDMI, DVI, or Display Port. In general, the GPU 221 may render image content in a pixel form. The display device 202 receives image content from the GPU 221 and displays the image content on a display screen.

In general, the system 200 can utilize processors 220 or 228 (e.g., a CPU) and/or a GPU 221 to generate and render a stereoscopic three-dimensional image (e.g., an output image 226 using one or more masks 206) on a display panel of display 202. For example, the system 200 can generate and render the left image 216 on a portion of a grid of pixels so as to be viewed through the microlens array 106 from a first location corresponding to the location of a first eye of the user. Similarly, the system 200 can generate and render the right image 218 on a portion of the grid of pixels so as to be viewed through the microlens array 106 from a second location corresponding to the location of a second eye of the user. In general, the left eye image 216 and the right image 218 may be generated and rendered to simulate parallax and depth perception for the user. That is, the left image 216 may represent a depth shift from the right image 218. For example, the grid of pixels 208 may display a first display image intended to be seen through the microlens array 106 by the left eye of a user and the grid of pixels 208 may display a second display image intended to be seen through the microlens array 106 by the right eye of the participant. The first and second locations can be based on a location (e.g., a lateral/vertical location, a position, a depth, a location of a left or right eye, etc.) of the user with respect to the display 202. In some implementations, first and second directions for generating the first and second display images can be determined by selecting certain pixels from an array of pixels associated with the microlens array 106.

In some implementations, the microlens array 106 can include a plurality of microlens pairs that include two microlenses. The display 202 may use at least two of the microlenses for displaying images. In some implementations, a processing device 228 may be available to display 202 to select a set of outgoing rays through which an image may be viewed through the microlenses to display the left image 216 and the right image 218 based on location information corresponding to the position of a user relative to the display 202. In some implementations, the position (e.g., location of the user) may be detected by a tracking system 230 associated with display 202 and/or system 200. In some implementations, the position may be determined using one or more camera devices (not shown) associated with system 200 and/or display 202.

In some implementations, each of a plurality of microlenses can cover (e.g., can be disposed over or associated with) a discrete number of pixels, such that each pixel is visible from some limited subset of directions in front of the display 202. If the location of the user observing the display is known, the subset of pixels under each lens of display 202 that is visible from a left eye of the user and the subset of pixels across the display 202 that is visible from the right eye of the user can be identified. By selecting for each pixel the appropriate rendered image corresponding to the virtual view that would be seen from the eye locations of the user, each eye can view the correct image. In some implementations, the location of the user with respect to the display 202 may be used to determine a direction for simultaneously projecting at least two images to the user of the display 202 via the microlenses 106, for example.

The display 202 may include one or more processing devices 228 that may include one or more central processing units, graphics processing units, other types of processing units, or combinations thereof. Processing devices 228 may perform functions and operations to command (e.g., trigger) display 202 to display images. Processing devices 228 may analyze captured visible light and/or infrared light and determine image data (e.g., data corresponding to RGB values for a set of pixels that can be rendered as an image) and/or depth data (e.g., data corresponding to the depth of each of the RGB values for the set pixels in a rendered image). Processors 228 may be the same as processors 220 if the computing system 200 be incorporated into the display 202. Similarly, tracking system 230 may utilize such resources if system 230 is incorporated into either or both system 200 or display 202.

In some implementations, display 202 can include memory 234. Memory 234 may be a volatile memory unit or units or nonvolatile memory units or units depending on the implementation. Memory 234 may be any form of computer readable medium such as a magnetic or optical disk, or solid-state memory. According to some implementations, memory 234 may store instructions that cause the processing device 228 to perform functions and operations consistent with disclosed implementations.

In some implementations, display 202 can include organic light emitting diodes (OLEDs) that are small enough to not be easily detected by a human eye or a camera lens thereby making display 202 effectively transparent. Such OLEDs may also be of sufficient brightness such that when illuminated, the area for the light emitted is significantly larger than their respective areas. As a result, the OLEDs, while not easily visible by a human eye or a camera lens, are sufficiently bright to illuminate display 202 with a rendered image without gaps in the displayed image. In some implementations, the display 202 may be a switchable transparent lenticular three-dimensional display. In such an example, the OLEDs may be embedded in a glass substrate such that glass is disposed between consecutive rows of the OLEDs. This arrangement results in display 202 being transparent when the OLEDs are not illuminated but opaque (due to the image displayed on display 202) when illuminated.

In the switchable transparent lenticular three-dimensional display implementations, the microlenses 106 of the microlens array can be made of a first material and a second material. For example, at least some of the microlenses 106 can be made of the first material and at least some of the microlenses 106 can be made from the second material. The first material may be a material that is unaffected (e.g., substantially unaffected) by electrical current while the second material may be affected (e.g., substantially affected) by an electrical current. The first material and the second material may have different indices of refraction when no current is applied to the second material, for example. Such an example assembly may result in refraction at boundaries between the microlenses of the first material and microlenses of the second material, thereby creating a lenticular display. When a current is applied to the second material, the current may cause the index of refraction of the second material to change to be the same as the index of refraction of the first material, neutralizing the lenticular nature of display 202 such that the two materials form a single rectangular slab of homogenous refraction, permitting the image on the display to pass through undistorted.

In some implementations, the current is applied to both the first material and the second material, where the current has the above-described effect on the second material and has no effect on the first material. Thus, when display 202 projects an image (e.g., the device OLEDs are illuminated), processing devices 228 may not apply a current to the microlens array and the display 202 may function as a lenticular array (e.g., when turned on). When the OLEDs of display 202 are not illuminated and processing device 228 detects visible light and infrared light, processing device 228 may cause a current to be applied to display 202 affecting the microlenses made of the second material. The application of current can change the indices of refraction for the microlenses made of the second material and the display 202 may not function as a lenticular array. For example, the display 202 may be transparent or function as a clear pane of glass without a lenticular effect.

According to some implementations, display 202 can include a speaker assembly, I/O devices, and/or other interface mechanisms. Processing devices 228 may be used to collect, receive, and/or generate image data, depth data, and/or location data to render stereoscopic three-dimensional images on display 202. Processing devices 228 can interpret audio data to command a speaker assembly to project audio corresponding to detected audio data. In some implementations, the image data, depth data, audio data, and/or location data may be compressed or encoded and processing device 228 may perform functions and operations to decompress or decode the data. In some implementations, image data may be a standard image format such as JPEG or MPEG, for example. The depth data can be, in some implementations, a matrix specifying depth values for each pixel of the image data in a one-to-one correspondence for example.

The tracking system 230 may include sensors, cameras, detectors, and/or markers to track a location of all or a portion of a user. In some implementations, the tracking system 230 may track a location of the user in a room. In some implementations, the tracking system 230 may track a location of the eyes of the user. In some implementations, the tracking system 230 may track a location of the head of the user.

In some implementations, the tracking system 230 may track a location of the user (or location of the eyes or head of the user) with respect to a display device 202, for example, may be used to configure masks for a left and a right eye of the user to display images with proper depth and parallax. In some implementations, a head location associated with the user may be detected and used as a direction for simultaneously projecting at least two images to the user of the display device 202 via the microlenses 106, for example.

In some implementations, the tracking system 230 may include (or utilize) a black and white camera. The black and white camera may return black and white (i.e., colorless) images. Such a camera may be sensitive to all colors of light including red, green, blue, and infrared.

In some implementations, the tracking system 230 may include infrared sensors and may employ one or more markers coupled to the user (e.g., reflective markers attached to the user) to pinpoint a location of the head of the user. As another example, an infrared camera can be used to pinpoint a location of the head of the user. For example, the infrared camera can be configured with a relatively fast face detector that can be used to locate the eyes of the user in at least two images and triangulate location in 3D. As yet another example, color pixels (e.g., RGB pixels) and a depth sensor can be used to determine (e.g., directly determine) location information of the user.

Figure 3:
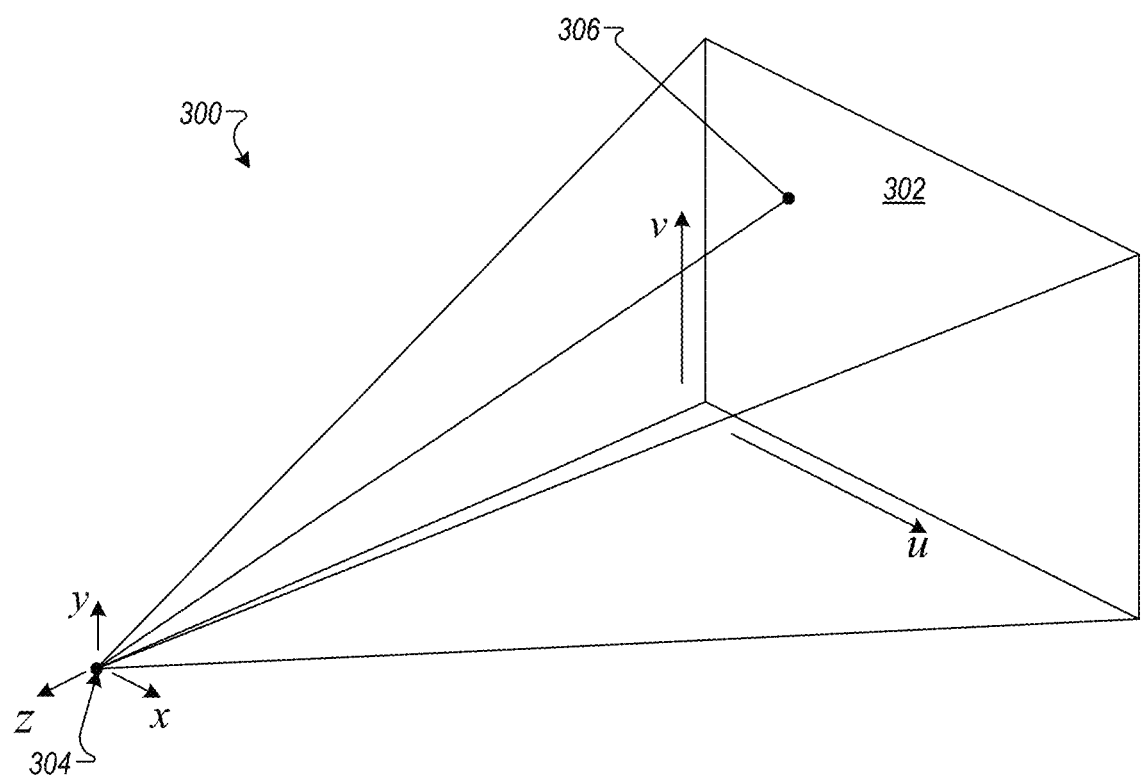
FIG. 3 is a diagram of an example image defined over a u-v plane from a position associated with a viewer of an image on a display screen, according to implementations described throughout this disclosure.

FIG. 3 is a diagram of an example image 302 defined over a u-v plane from a position 304 of a head of a viewer of the image on a display screen 302. In this example, a position 306 is being viewed on the display screen 302. An eye of a user is represented at position 304. Here, the relationship between the position 304 and position 306 is defined in five dimensions as a function: M(u, v, x, y, z). The value of function M is a scalar value that is computed by system 200 for image content each time a user head movement is detected. The value of M may be a zero if a particular calculated pixel (e.g., at position 306) is not viewable by a left eye of the user at position 304. The value of M may be a one if a particular calculated pixel (e.g., at position 306) is viewable by a left eye of the user at position 304. Similar calculations and assignment of one or zero can be performed for the right eye of the user. In some implementations, additional calculations of the function M for both the left and right eyes may be performed for each representable (e.g., color red, green, and blue (RGB)) of each pixel.

In the example of FIG. 3, the screen 302 is shown defined over the u-v plane and is dependent on a position (e.g., x, y and z) of the head of a user viewing the display 302 depicting images, for example. For any one color, the scalar value of function M depends on at least five variables, and thus function M is five-dimensional. However, the system 200 may determine masks for both of a left and right eye of a viewer of the image 302 if each pixel on a display depicting images on screen 302 is known and if each head position in a specific plane is known. Thus, the system 200 can determine the masks for properly displaying the image to a user on display screen 302 by using four of the five dimensions. For example, the function, M, can be reduced to a four-dimensional function instead of a five-dimensional function.

Figure 4:
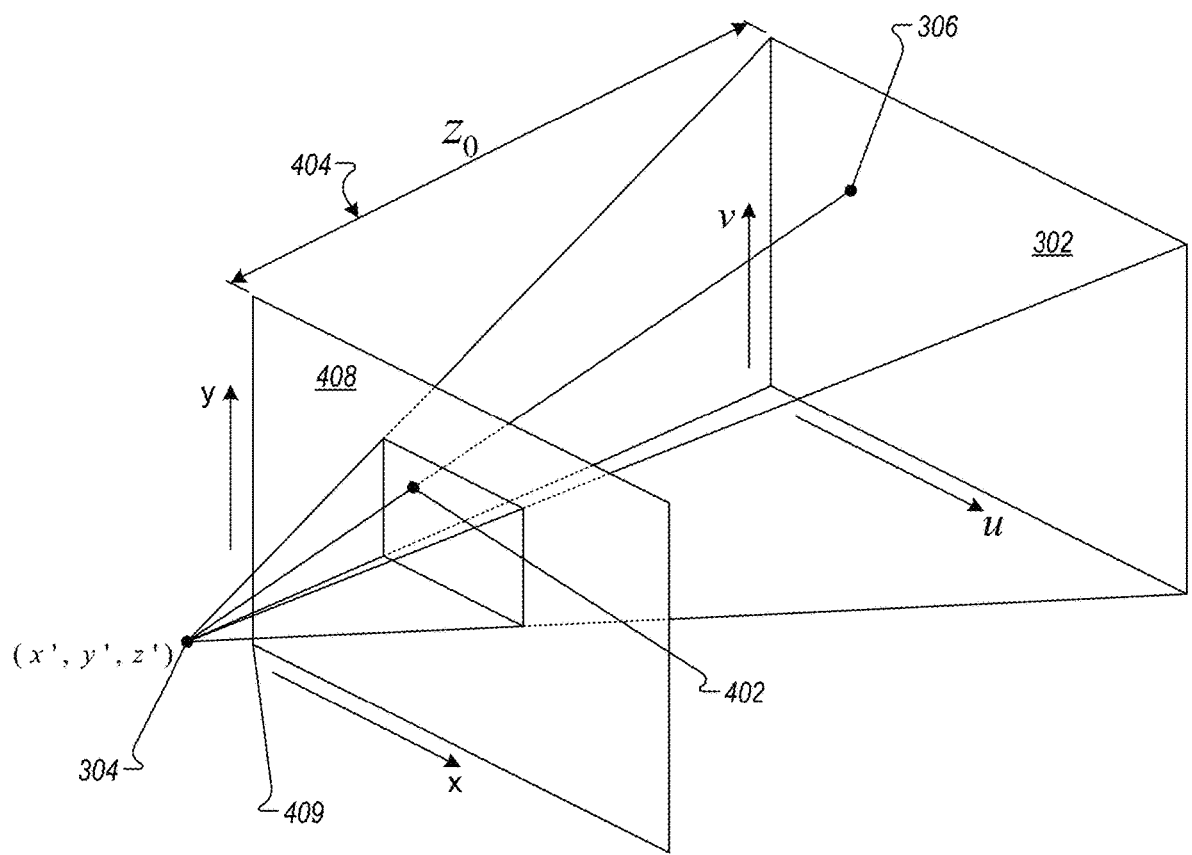
FIG. 4 is a diagram illustrating an example geometric relationship between a head position of a viewer and a location in an example three-dimensional plane representing a display screen.

FIG. 4 is a diagram illustrating an example geometric relationship between a head position of a viewer (represented at location 304) and a location (e.g., position 306) in a three-dimensional plane of a display screen. FIG. 4 depicts data graphically in four dimensions, which is reduced in one dimension from data shown in five dimensions in FIG. 3. Reducing a dimension may include the system 200 defining an image M (e.g., image on a screen 302) at a known distance $z_0$ 404.

FIG. 4 also illustrates a geometric relationship between the arbitrary head position (x', y', z') 304 (corresponding to a location 402) and the location 306 in the arbitrary plane (x, y, $z_0$) 408. The origin of plane 408 is shown at location 409. The u-v plane 302, the screen and the plane z=0 all coincide, while the plane z=$z_0$ coincides with the x-y plane 408.

In general, head positions may be calculated and stored for the plane 408 and can be correlated to any head position that may view plane 408. The system 200 can determine a change in head position of any position (e.g., position 304) based upon the stored head positions corresponding to a parallel plane 408. Head positions in the plane that holds head position (x', y', z') 304 can be calculated using the stored head positions in the plane (x, y) 408, because light travels in a straight line. The plane 302 may represent a screen of display 202, for example. To determine whether a pixel at location 306 on plane 302 is visible from a particular position (e.g., position 304), the system 200 may determine whether the pixel at location 306 is visible from position 402, in a parallel plane.

As used herein, a capital M notation may represent the 4D function (e.g., M(u, v, x, y) illustrated in FIG. 4. The algorithms described herein may determine such a 4D function, M(u, v, x, y)=M(u, v, x, y, $z_0$). Upon determining the 4D function, the systems described herein (e.g., system 200) may represent the function as a topographical contour plot (e.g., a surface) to ensure that the function is low frequency. Representing the function as a low frequency surface can enable sub-sampling in an efficient manner. Once sub-sampling occurs, the system 200 may interpolate the representative surface to recover the function M.

For example, the system 200 may use the function M as a contour plot of a low-frequency function S. To simplify calculations, the 4D function M may be simplified to a 2D image m as the contour plot of a 2D image s. In general, m and s may both vary with head position.

Locations of the lenticular lenses of microlens array 106, for example, projected onto the screen of display 202 may be represented as contour lines of a low-frequency image, or a topographical surface, s(u, v). This low-frequency surface is 4D because the surface is dependent upon a point in the x-y plane from which the screen is being viewed. A capital S may be used throughout this disclosure to indicate the 4D surface, S(u, v, x, y).

Figure 5A:
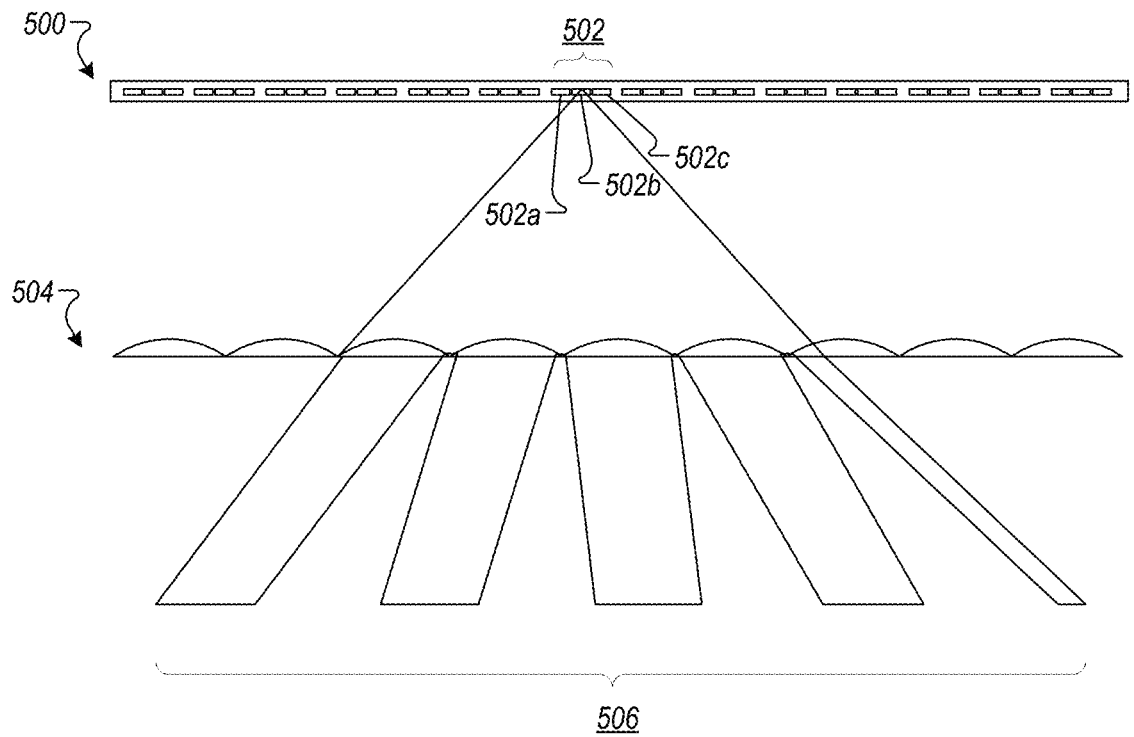
FIGS. 5A-5C illustrate example optical features provided by the implementations described throughout this disclosure.
Figure 5B:
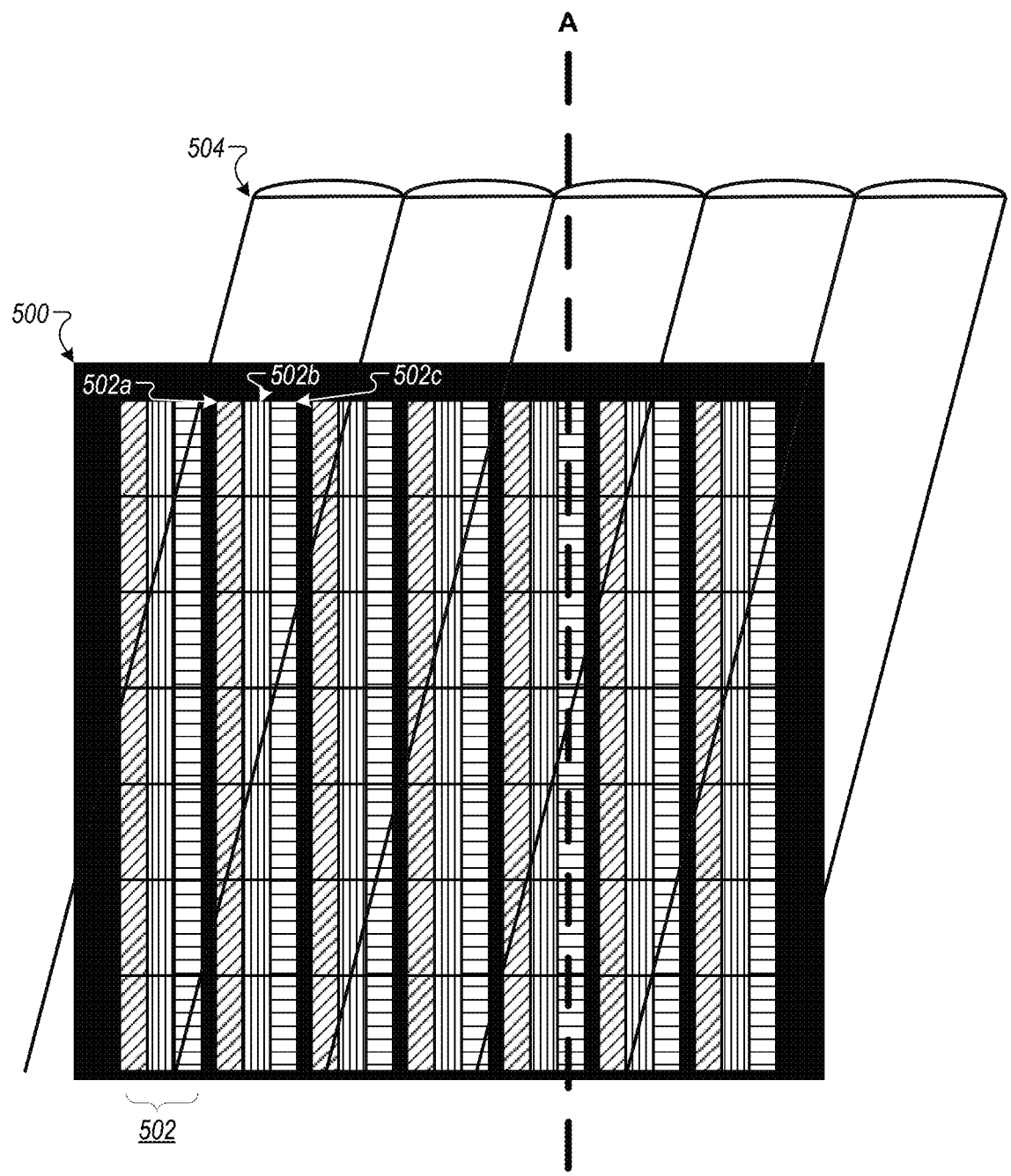
Figure 5C:
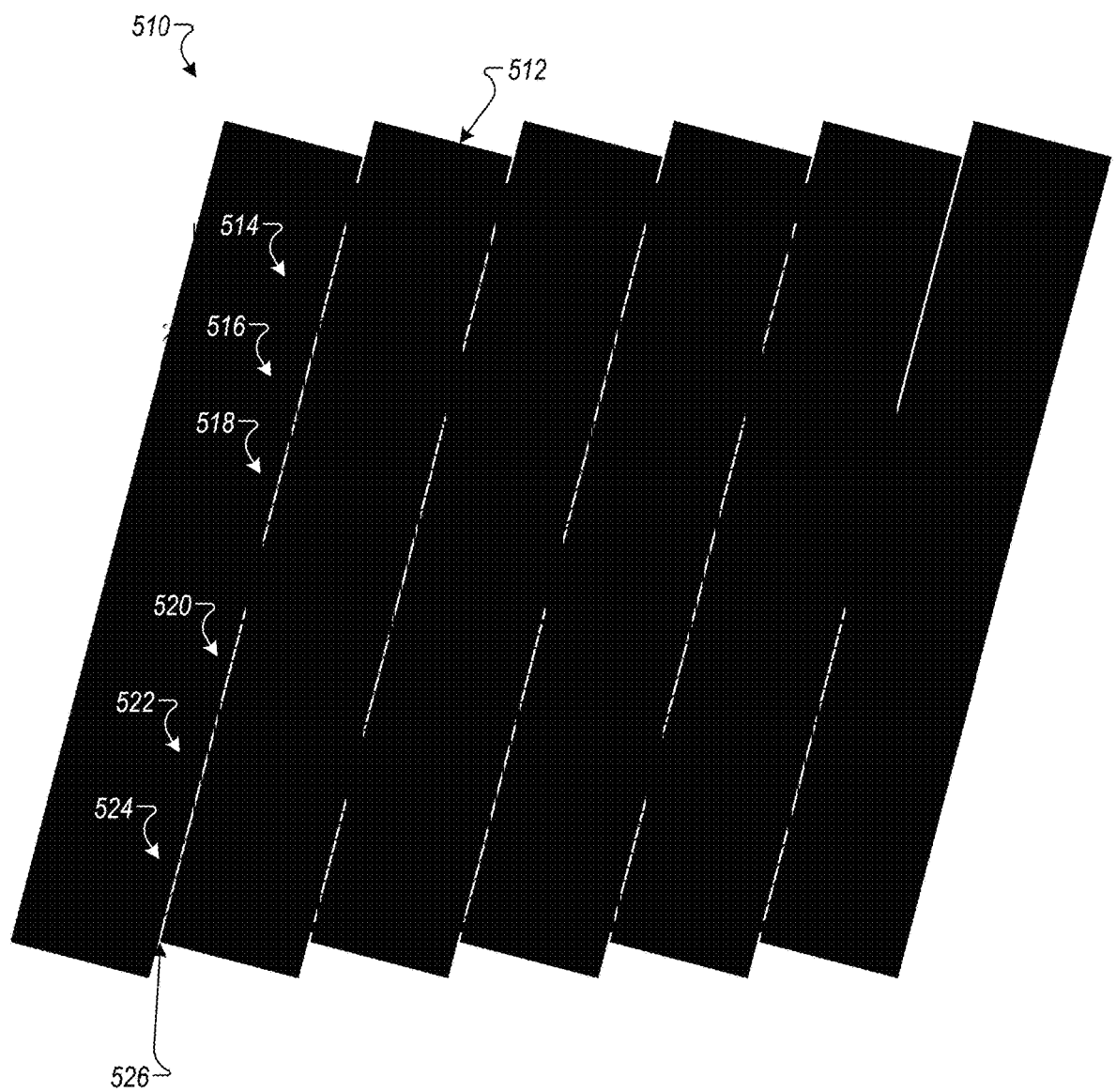

To facilitate further concepts described below, optical features associated with autostereoscopic display devices will now be described. FIGS. 5A-5C illustrate example optical features provided by the implementations described throughout this disclosure. As shown in FIG. 5A, a cross-sectional view of an autostereoscopic display device 500 is shown. Each pixel 502 may emit red, green, and blue light via respective red, green, and blue subpixels (subpixel 502a, subpixel 502b, and subpixel 502c). The color of each pixel 502 may be selected by a processor associated with the display 500. Each pixel 502 has a directional and multimodal emission beam.

The display device 500 is shown here adjacent to a row of cylindrical lenses 504 positioned in a front emitting surface. The cylindrical lenses may be lenticular lenses (or a lens array) that receives the emitted light from the display device 500 and transmits the light to a viewer, as shown by light beams 506. In some implementations, the lens array 504 is coupled to the display device 500 via a glass spacer. The lens array 504 may function to focus the light from each emitting pixel, as shown by light beams 506. The lens array 504 ensures that each light beam is spaced a distance apart with a gap between each light beam emitted from the array 504. The system 200 can ensure that a particular pixel may beam light into one eye of a user while avoiding beaming light into the other eye of the user.

FIG. 5B illustrates an example front view of a portion of the display device 500. The subpixels (e.g., subpixels 502a, 502b, and 502c) are shown in columns with the lens array 504 in front of the emitting pixels of the display device 500. In some implementations, an angle of the lens array 504 may be at about 15 degrees offset from line A. Line A is perpendicular to a bottom edge of the display 500. Other angles are possible.

FIG. 5C illustrates another example front view of a portion of the display device 500. In some implementations, the lenticular lens array (e.g., lens array) may function similar to the barrier display 510 to filter out image content (e.g., pixels) so that the system may provide particular image content for each eye of a user viewing display device 500. The barrier display 510 blocks particular pixels and shows other pixels, similar to a lenticular lens array. If the gaps in the barrier display 510 coincide with the center optical axes of the cylindrical lenses, then the same pixels are blocked or shown.

In general, the lens array is chosen to provide a specific distance between light beams emitting through each lens in the array 504. For a lenticular lens array (not shown), a barrier 510 and a barrier 512 may be configured to block all light except for pixels 514, 516, 518, 520, 522, and 524.

The unblocked pixels may be aligned directly in a center location of a particular lenticular lens in the lens array. Similar configurations can be arranged to block and show other pixels in display 500. In these configurations, a user may view pixels shown through a gap 526. The barriers 510 and 512 may be used to display a shifted version of pixels from an image meant for viewing by a left eye to a version of pixels from the image meant for viewing by a right eye.

To simulate such a barrier as shown in FIG. 5C, the system 200 may calculate a mask for each eye of a user viewing a display device from a location (x, y, z). In some implementations, each mask (e.g., mask 100A for a left eye and a shifted version of mask 100B for a right eye) may represent a per-pixel 3-color value that provides a proper view of a particular image from the display 500, for example. Example values for each pixel in the mask may include a 1.0 or 0.0. A value of 1.0 indicates that a pixel in the mask is visible. A value of 0.0 indicates that a pixel in the mask is not visible.

Figure 6A:
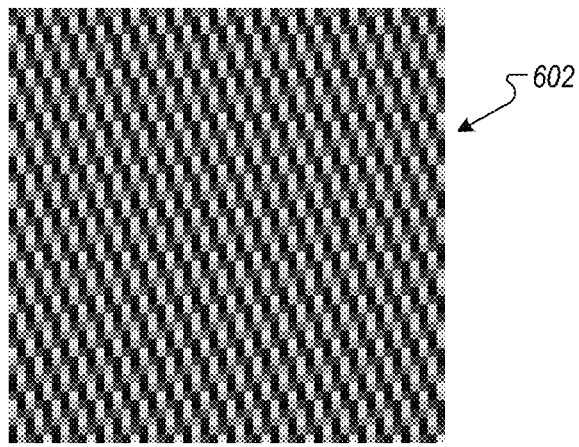
FIGS. 6A-6C illustrate example masks sampled at various pixel locations for an autostereoscopic display, according to implementations described throughout this disclosure.
Figure 6B:
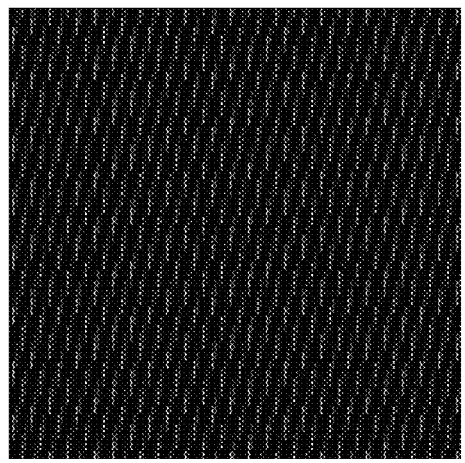
Figure 6C:
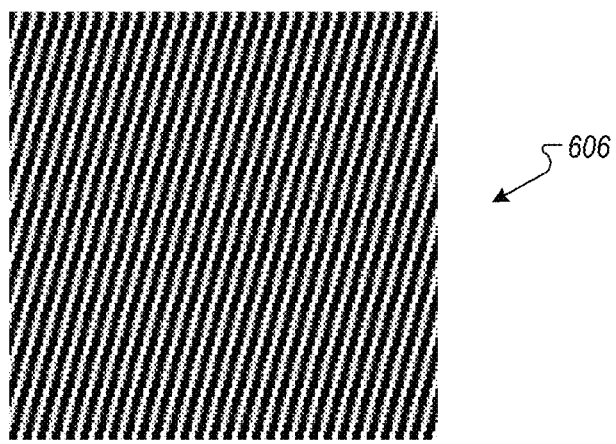

FIGS. 6A-6C illustrate example masks sampled at various pixel locations for an autostereoscopic display, according to implementations described throughout this disclosure. FIG. 6A depicts an example mask 602 (e.g., m(u, v)=M(u, v, x, y, z)) that represents a 50×50 region on a display screen for a selected set of values for position (x, y, z). The mask 602 includes an RGB image as displayed on a screen of a computing device. Mask 602 indicates which pixels should be illuminated for a particular image from a specific determined location on the display 202 and which pixels should be extinguished (or remain off). In particular, mask 602 indicates which pixels should be illuminated or extinguished based on a detected position of a user viewing the display 202, for example. The mask 602 depicts half of the pixels illuminated and half of the pixels extinguished.

FIG. 6B depicts a mask 604 as viewed on a lenticular display screen. The mask 604 (e.g., m(u, v)=M(u, v, x, y, z)) illustrates RGB subpixel structure. A mask 604 may be calculated for each of the left eye and the right eye. In general, the right eye mask results in a shifted version of the left eye mask based on a known symmetry of the distance between the eyes of the user.

FIG. 6C depicts a mask 606. The mask 606 is a version of the mask 604 with color filters removed. The mask 606 illustrates lenticular stripes throughout. When mask 606 is used to display content on display 202, for example, the lenticular lines as viewed by a left eye of the user line up with the white stripes while the lenticular lines as viewed by a right eye of the user line up with the black stripes.

Figure 7A:
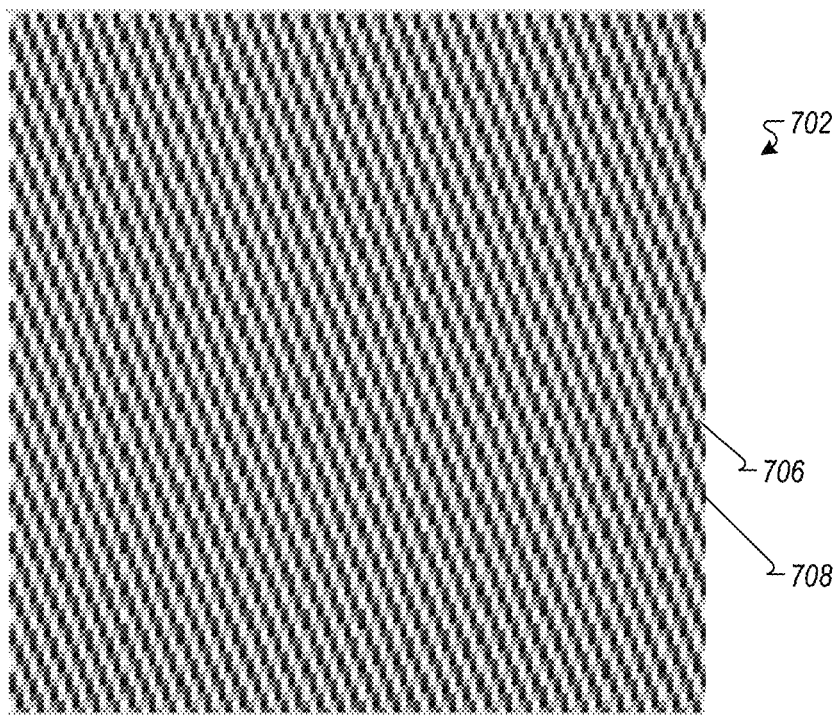
FIGS. 7A-7B illustrate example masks that are used to generate the image in FIG. 8C, according to implementations described throughout this disclosure.
Figure 7B:
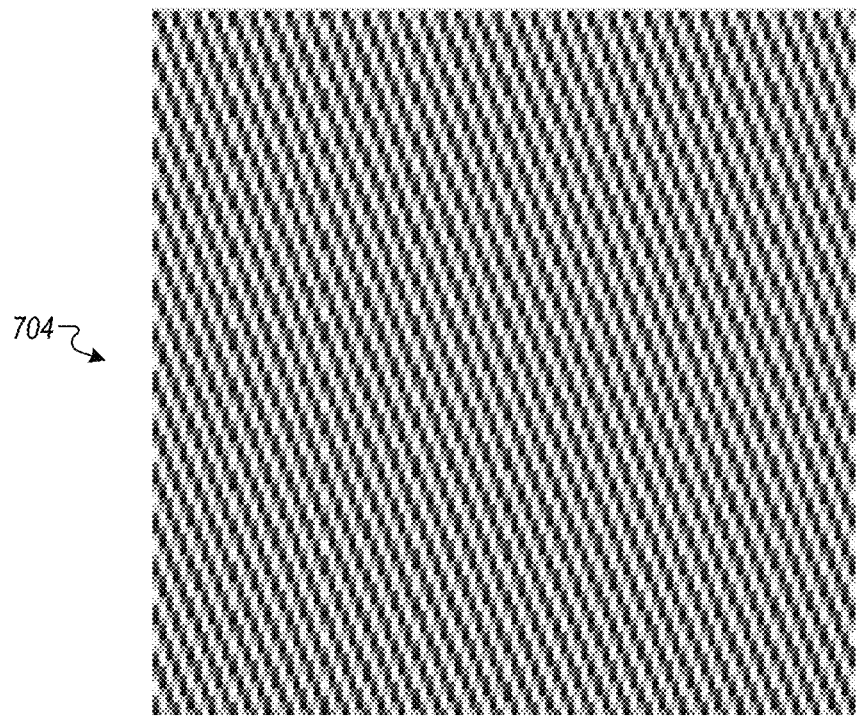
Figure 8A:
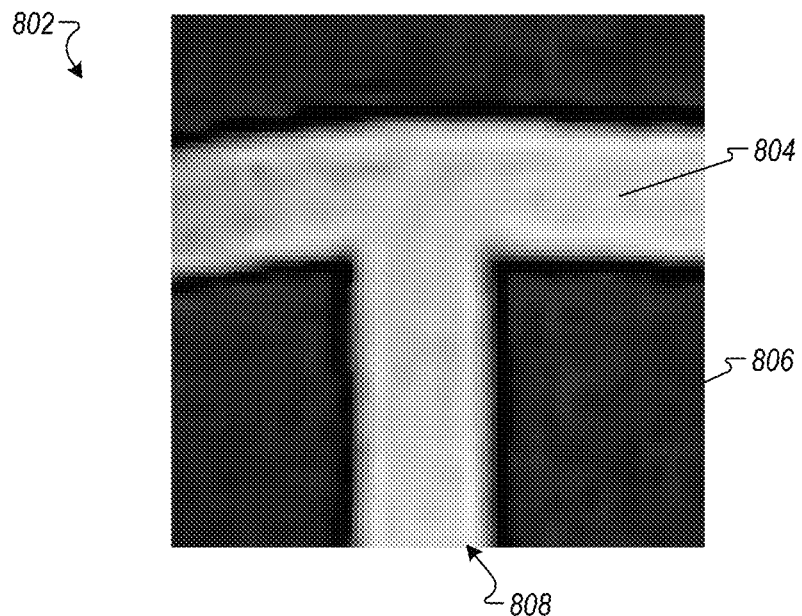
FIGS. 8A-8C illustrate example images for provision on a stereoscopic display, according to implementations described throughout this disclosure.
Figure 8B:
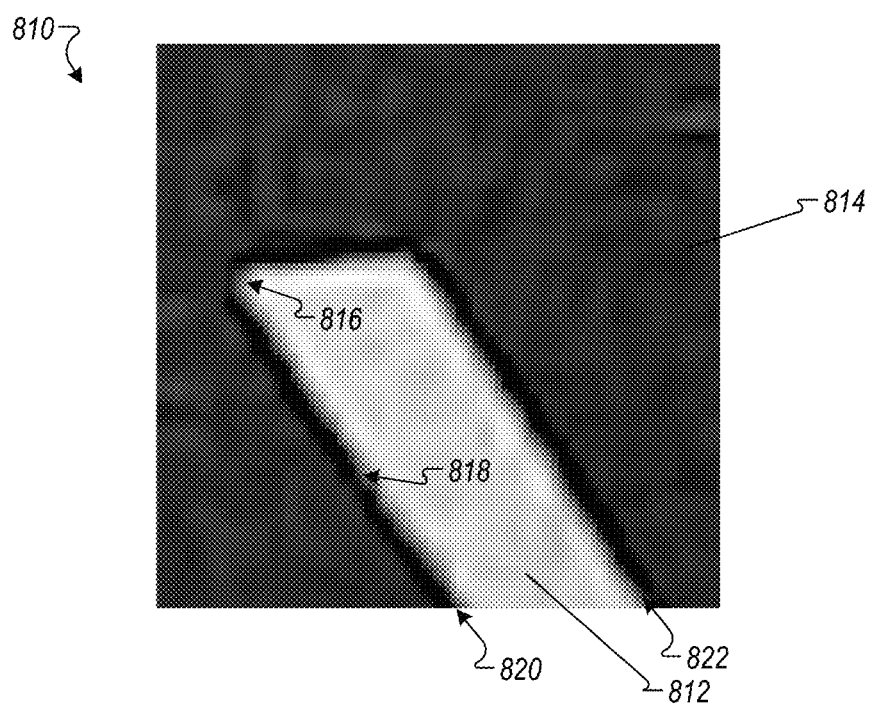
Figure 8C:
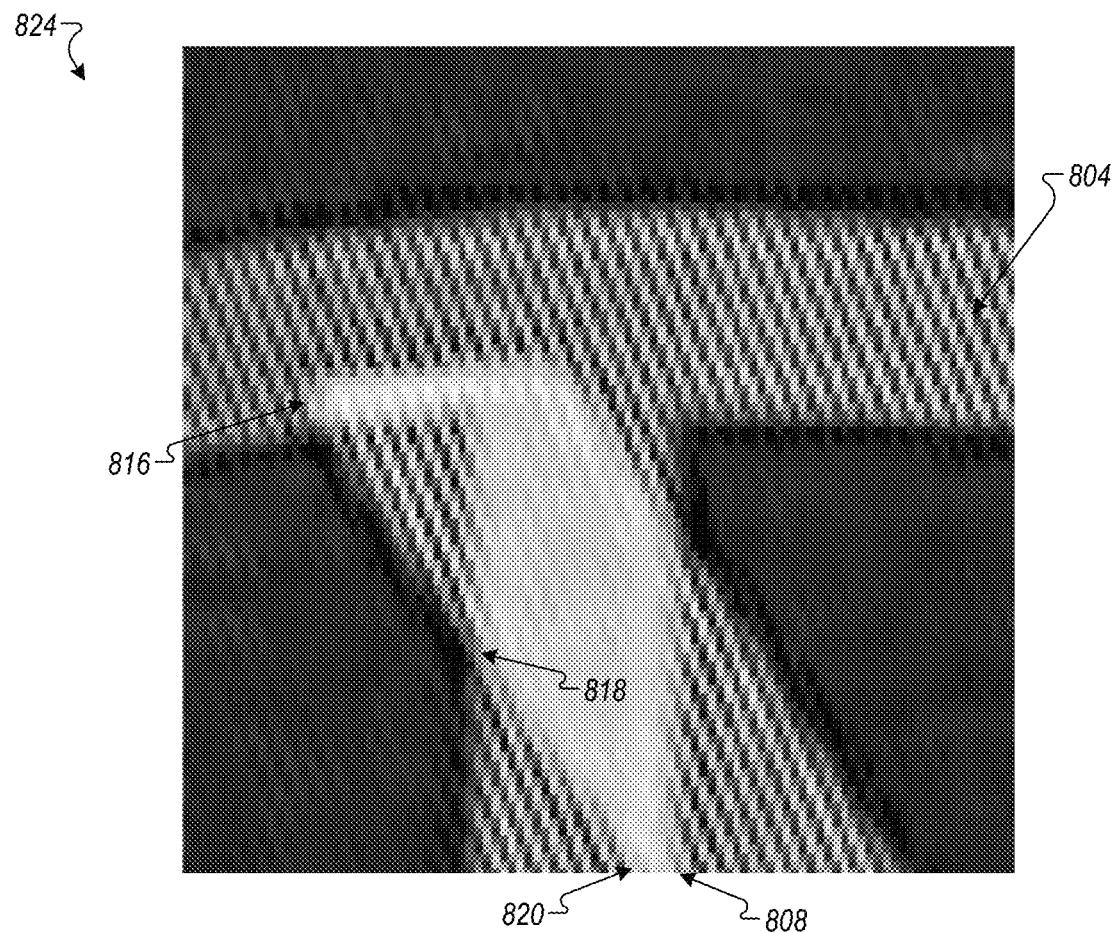

FIGS. 7A-7B illustrate example masks that are used to generate the image in FIG. 8C. FIG. 7A is a mask (m) 702 determined by system 200 for a left eye of a user accessing the display 202, for example. FIG. 7B is a mask 704 determined by system 200 for a right eye of the user accessing the display 202, for example. Lenticular lines 706 and 708 are depicted in alternating colored stripes.

Masks 702 and 704 may vary rapidly with u and v, but may also change rapidly with a change in head position. For example, a change in an x location of about 60 millimeter may cause the lenticular pattern to invert. The masks 702 and 704 may be calculated and generated by system 200 using algorithms 224 and tracking system 230. The masks 702 and 704 are determined and/or calculated corresponding to a head position of a user viewing display device 202 and a number of pixels on display 202.

FIGS. 8A-8C illustrate example images for provision on a stereoscopic display, according to implementations described throughout this disclosure. The images 802 and 804 in FIG. 8A and FIG. 8B may be provided to display device 202 along with masks 702 and 704. For example, once the mask 702 and the mask 704 are calculated for each of the left eye and the right eye, the system 200 may use the left mask 702 and multiple that by a left image 802. Similarly, the system 200 may use the right mask 704 and multiply that by the right image 810. The summation of the left mask 702 multiplied by the left image 802 and the right mask 704 multiplied by the right image 810 generates an output image 226 (e.g., $I=m_R I_R+m_L I_L$) to be displayed to the user viewing display 202, for example. In some implementations, the display 202 may include circuitry and processing software and hardware to calculate output images. In some implementations, the system 200 retrieves image 802 and image 810, calculates mask 702 and mask 704, and provides the resulting output image (I) 226 to display device 202.

As shown in FIG. 8A, white image content 804 corresponds to pixels that are illuminated and visible to the left eye of the user, while dark content 806 corresponds to extinguished pixels. A number of features including feature 808 may be depicted. As shown in FIG. 8B, a right image 810 includes white image content 812 which corresponds to pixels that are illuminated and visible to the right eye of the user, while dark content 814 corresponds to extinguished pixels that are viewed as black to the user. Image 810 includes several image features 816, 818, 820, and 822.

FIG. 8C illustrates an example output image 824 that is stereo weaved by the systems and techniques described herein. The output image 824 is a swizzled image stereographically weaved by system 200 using image 802, image 810, mask 702, and mask 704. Features may appear to overlap, as the output image is configured to properly display content to both a right eye and a left eye of a user viewing display 202. In particular the feature 808 in FIG. 8C corresponds to the same feature 808 shown in FIG. 8A. Similarly, the feature 816 in FIG. 8C corresponds to the same feature 816 shown in FIG. 8B. In addition, features 818, and 820 in FIG. 8C correspond to respective features 818 and 820 in FIG. 8B. Image feature 804 shown in FIG. 8C corresponds to feature and location 804 in FIG. 8A.

FIG. 9 is a diagram of an example grid 902 representing a sparsely sampled four dimensional (4D) surface. The surface may represent a mask (of values) correlated to either a left or a right eye, as described throughout this disclosure. The grid 902 is in the (x, y) plane and represents a sample of pixel values of lenticular display device, such as display 202, represented here as a grid 904 in the (u, v) plane.

Returning to the calculations of the mask as a surface S, 2D image s(u, v) may appear as a plane from a fixed head position (e.g., fixed (x, y)). For example, s can be expressed as $S=C_1 u+C_2 v+C_3$, where $C_1$, $C_2$ and $C_3$ are constants. From this point, the system 200 may interpolate the plane to determine a mask for a left eye and a mask for a right image. For example, the display device may have a screen that may be represented as a plane using values at the corners of the screen. The system 200 may bi-linearly interpolate to obtain all values of one, indicating which pixels are visible from a particular head position (e.g., position 906). In general, as x and y change, the slope of the plane ($C_1$ and $C_2$) may remain the same, but the offset ($C_3$) may change. This offset varies linearly with x and y. Thus, the system 200 may store the values at the four corners of the x-y plane and may later interpolate pixel values to generate masks according to a particular head position.

If the system stores the four values at the corners of the screen of device 904, sixteen values are utilized (e.g., 2×2×2×2=16). This is because each of the four variables can have two possible values. Compensations can be made to account for defects in the lenticular lenses, or other manufactured portions of a lenticular display device by subsampling at a lower rate or size. For example, to compensate for device imperfections, the system 200 may subsample the 4D surface S at 17×10×5×3 points for example. The surface S (e.g., S(u, v, x, y)) is stored on the sparse grid 902. The grid 902 is later linearly interpolated to obtain a value of s for every pixel on the screen of device 202, represented by grid 904, for example, and for any value of head position (x, y).

As used herein, square brackets may indicate a discrete sampled function that is defined for integer input variables. For example, the surface function $S[U, V, X, Y]=S(U\Delta_u, V\Delta_v, X\Delta_x, Y\Delta_y)$, where capital letters U, V, X and Y represent integers and $\Delta_u$, $\Delta_v$, $\Delta_x$ and $\Delta_y$ represent the spacing of the sampling grid shown in FIG. 9. In some implementations, the width of the display device works out to be $16\Delta_u$.

In some example implementations, a subsampled version of the surface function S may be stored by a processor 220 in memory, for example. Such a subsampled version may use an array in the size of (17×10×5×3=2550) floating point numbers. The (17×10) metric represents the u-v plane of grid 904 (representing the display 202, for example) and the (5×3) metric represents for the x-y plane of the grid 902. In some implementations, an additional factor of three is utilized to represent three colors (e.g., RGB) in the mask and final output image.

In operation, system 200 may determine (or predict) a head position 906 (e.g., position (x', y', z')). For example, the tracking system 230 may determine a head position of a user accessing display 202. The tracking system 230 may predict that the head position may be in a different location based on a detected speed of the user, for example. The head position may be used to calculate a 2D image (e.g., 17×10 samples), s[U, V] using processor 220 for example. Processor 220 may send the 2D image to the GPU 221. For example, the head of the user may be determined at a fixed at position 906 (x', y', z'). The system 200 may calculate the individual values of s[U, V] one at a time. For example, the system 200 may calculate the pixel values of s[U, V] in which U=3 and V=6. That is, the system may calculate s[3, 6], shown by box 908 in FIG. 9.

To calculate pixel values of example box 908, the system 200 may locate point 910. Point 910 may represent a location on the x-y plane that is on the straight line through (x', y', z') and (u, v)=$(3\Delta_u, 6\Delta_v)$. By way of example, if point 910 is located at (x, y)=$(1.6 \Delta_x, 1.3 \Delta_y)$, the system 200 can calculate s[3, 6] by taking a weighted sum of the four values, in a first corner 912 (e.g., S[3, 6, 1, 1]), a second corner 914 (e.g., S[3, 6, 2, 1]), a third corner 916 (e.g., S[3, 6, 1, 2]), and a fourth 918 corner (e.g., S[3, 6, 2, 2]). The values at corners 912, 914, 916, and 918 represent the values of s[3, 6] as viewed from each respective corner 912-918.

The system 200 may utilize weighting factors that follow normal bilinear interpolation using the values at corners 912-918. For example, s[3, 6] can be calculated at each respect corner 912-918 and may be equivalent to 0.4×0.7×S[3, 6, 1, 1]+0.6×0.7×S[3, 6, 2, 1]+0.4×0.3×S[3, 6, 1, 2]+0.6×0.3×S[3, 6, 2, 2]. Such a calculation may be performed for each of the (17×10) samples of s[U, V]. Upon completion, the processors 220 may send the subsampled image to the GPU 221. Thus, the mapping from the arbitrary (x', y', z') location 906 to the $z=z_0$ plane and the bilinear interpolation within the $z=z_0$ plane happens in the processors 220 (e.g., at a CPU), and a (17×10) image is uploaded to the GPU 221. The GPU 221 may support automatic hardware bilinear interpolation to ensure that s(u, v) may be quickly determined for every pixel on the display 202, for example.

Next, the calculated values for s may be converted to an actual mask value, m. For example, the mask generation algorithms 224 may perform a non-linear mapping on the value of the fractional part of surface s (e.g., frac(s)) to determine a value for each pixel (and subpixel) represented in the mask m. That is, for a number s the integer part of the number is the largest integer that is not greater than s and the fractional part of s is the difference between the integer part and s. The values may include ones and zeros to indicate an illuminated state or an extinguished state, respectively.

Figure 10:
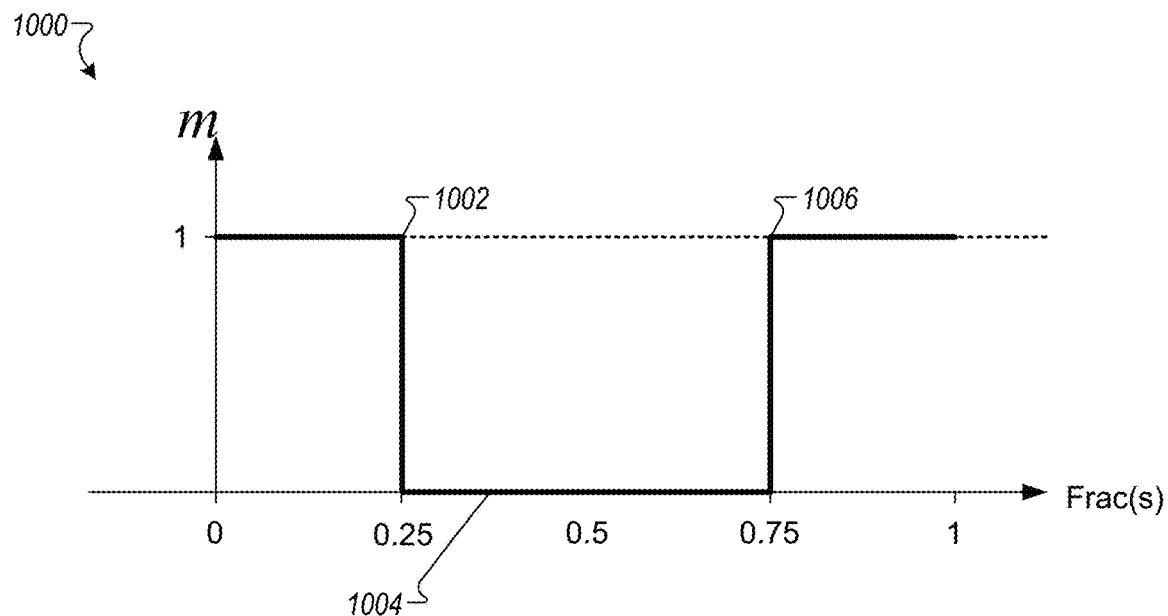
FIG. 10 is an example diagram of a function used to determine illumination or extinguishing of a pixel, according to implementations described throughout this disclosure.

In general, mask m may be based on frac(s) and the relationship is depicted in FIGS. 10-13. When frac(s)=0, corresponding to the white line 706, which indicates that those pixels are visible to the user. When frac(s) is as far away from 1 as possible (e.g., frac(s)=0.5), corresponding to the black lines 708, which indicates that those pixels are not visible to the user. Such an example is shown in FIG. 10 where frac(s)=0, m=1 and when frac(s)=0.5, m=0.

The system 200 can use the frac(s) to calculate values for each pixel of the display 202. Once the frac(s) are calculated, the mask generation algorithm 224 may calculate normalized texture coordinates corresponding to a current viewpoint of a user. Four neighboring blocks can be selected to calibrate an image and bilinear interpolation may be carried out to compute view-dependent calibration pixel values.

The algorithms 224 may generate one or more 4D lookup tables to be used to determine the stereo weaving of pixels using the masks 206. The 4D lookup table in the above examples may include a lookup table with a size of 17×10× 5×3 pixels. In operation, the system 200 can use tracking system 230 to track the user and determine that the head and/or eyes of the user are at a location in the x-y plane. A straight line can be interpolated from the location to a sampling point in the u-v plane (representing display 202). A mask for the left eye and a mask for the right eye can be retrieved from masks 206. The lookup table may be used to retrieve values at the four corner locations 912, 914, 916, and 918. The retrieved values may be used to generate a left eye mask and a right eye mask for weaving together left images and right image images. Such weaving of images can provide 3D imagery with proper parallax and depth.

The diagrams shown in FIGS. 10-13 provide a way to represent a low-frequency image (e.g., surface s and function S) that may be subsampled and interpolated to recover the 4D high-frequency function M The mask m may used to determine which portions of pixels are to be supplied to each eye of a user viewing image content on the display devices described herein. In general, the mask generation algorithms 224 may generate a mask for the left eye and a mask for the right eye of the user viewing the display 202. The two masks add to one. Errors in tracking may cause visible flicker and user observed residual imagery. Thus, the system 200 may use tracking system 230 to track a midpoint location between the eyes of the user viewing the display 202 rather than tracking two separate locations representing a left eye and a right eye. From the midpoint location, the system 200 may utilize a single value of s which may be provided as output into two nonlinear functions, shown in example diagrams in FIGS. 11-13.

FIG. 10 is an example diagram 1000 of a function used to determine illumination or extinguishing of a pixel. The diagram 1000 shows a relationship between the values of s and the values of m. In this example, s is a two-dimensional image representing a topographical surface. If the value of s at a particular pixel is 6.37, for example, that pixel may be in the third column over and the seventh row down with respect to a lenticular display. To determine which mask image m to use for that same pixel, the system can determine the value of 6.37 and use that value to find fractional pieces (e.g., 0.37). The non-linear function shown in FIG. 10 may be applied to find the value of m at that pixel. In this example, the system 200 may determine that the value of m at the determined pixel is zero (as shown at line 1004). This non-linear function 1000 is applied on a pixel-by-pixel basis to all the pixel values in s to obtain the values in m.

The diagram 1000 may not be desirable for displaying 3D content because pixels may switch abruptly at the verticals slopes shown at location 1002 and location 1006. The abrupt switch may cause distortion and flicker. Accordingly, the system 200 may utilize functions that include a gradual transition, as shown in FIGS. 11-13.

Figure 11:
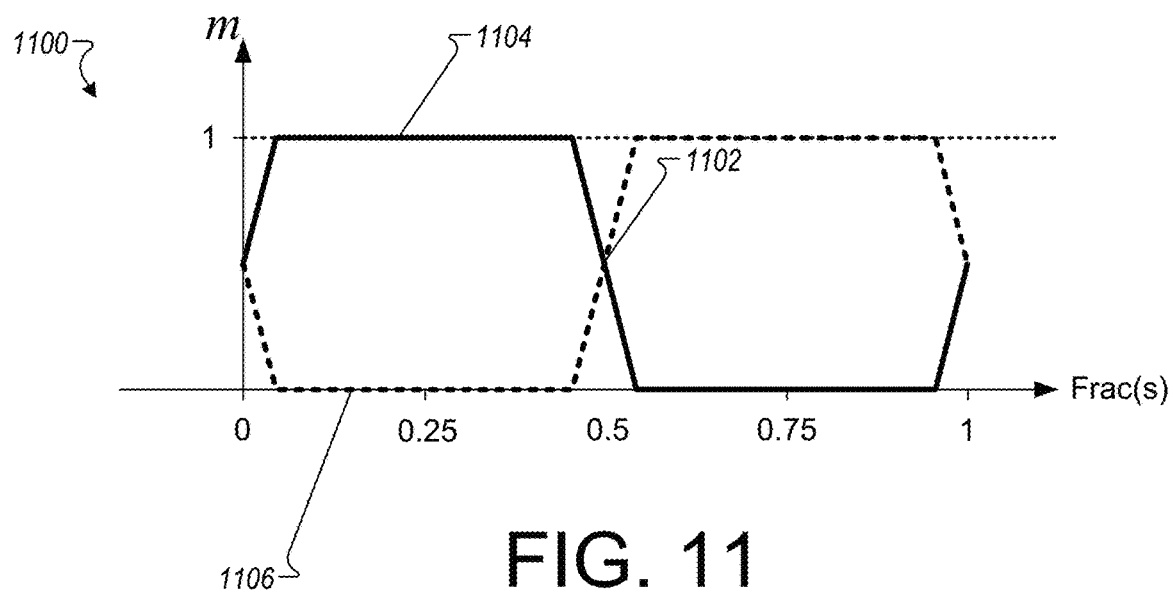
FIG. 11 is an example diagram of another function used to determine illumination or extinguishing of a pixel, according to implementations described throughout this disclosure.

FIG. 11 is an example diagram 1100 of a function used to determine illumination or extinguishing of a pixel. Because a gradual transition may provide a less distorted and smoother image than the switch shown in FIG. 10, a gradual slope is introduced at the transition point 1102 that roughly corresponds to one pixel in width. In this example, the plot 1104 corresponds to $m_L$ (e.g., the left mask). The plot 1106 corresponds to $m_R$ (e.g., the right mask).

Figure 12:
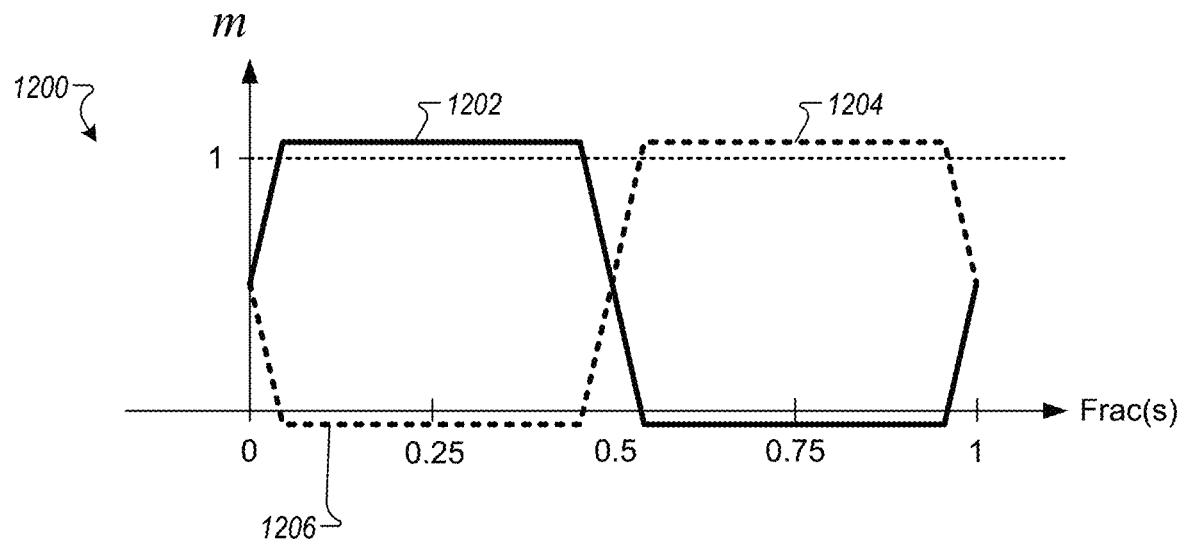
FIG. 12 is an example diagram of another function used to determine illumination or extinguishing of a pixel, according to implementations described throughout this disclosure.

FIG. 12 is another example diagram 1200 of a function used to determine illumination or extinguishing of a pixel. In this example, the plot 1202 corresponds to $m_L$ (e.g., the left-eye mask). The plot 1204 corresponds to $m_R$ (e.g., the right-eye mask). As shown at location 1206, the value of m may be allowed to be below zero. By allowing the value of m to go negative, the system 200 can subtract a portion of the left image mask 206A from the right image mask 206B to compensate for (i.e., cancel) signal crosstalk that may be introduced by scattering of light. The nonlinear function shown in FIG. 12 may be used to compensate for such signal crosstalk. Analyzing crosstalk cancellation using such techniques can enable introduction of a nonlinear function which can apply varying amounts of crosstalk cancellation that depend on the interpupillary (IPD) distance of the viewer. One example nonlinear function that may be used to cancel crosstalk amongst pixels is shown in FIG. 13.

Figure 13:
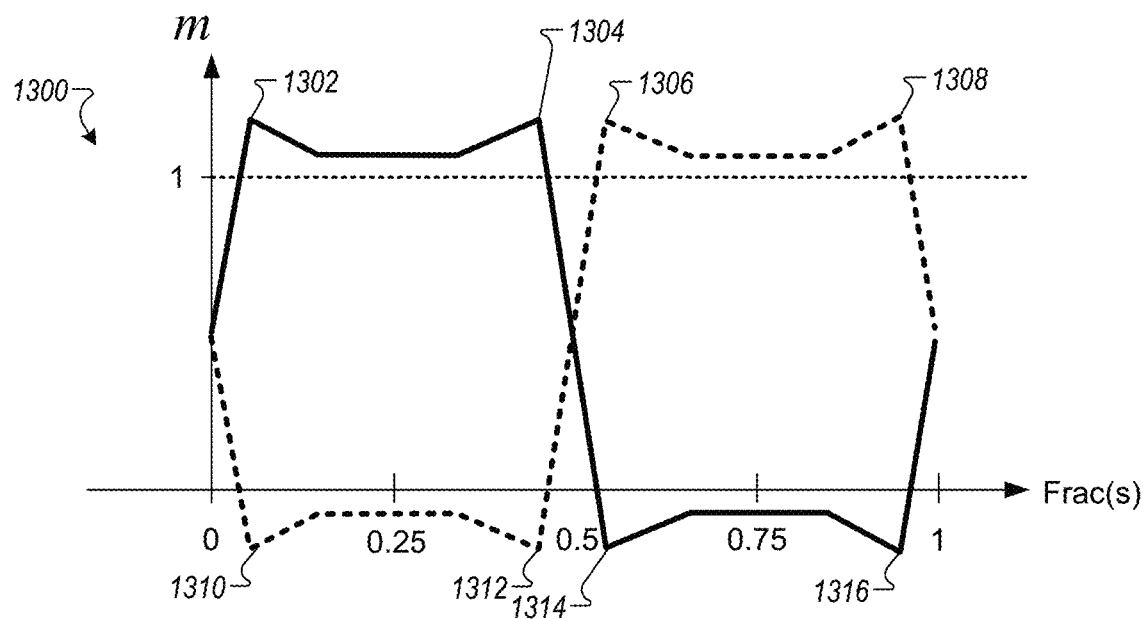
FIG. 13 is an example diagram of yet another function used to determine illumination or extinguishing of a pixel, according to implementations described throughout this disclosure.

FIG. 13 is an example diagram 1300 of a nonlinear function used to determine illumination or extinguishing of a pixel. The mask generation algorithms 224 can implement such a function in software or hardware (e.g., in an FPGA or an ASIC) to map s to mask m. The diagram 1300 depicts a left eye function with non-linear movement at locations 1302, 1304, 1306, and 1308. Similarly, a right eye function is depicted with non-linear movement at locations 1310, 1312, 1314, and 1316. The function 1300 may be used to cancel crosstalk without knowledge of the interpupillary distance (IPD) associated with the user. This may provide robust error detection or avoidance of errors in tracking.

Figure 14:
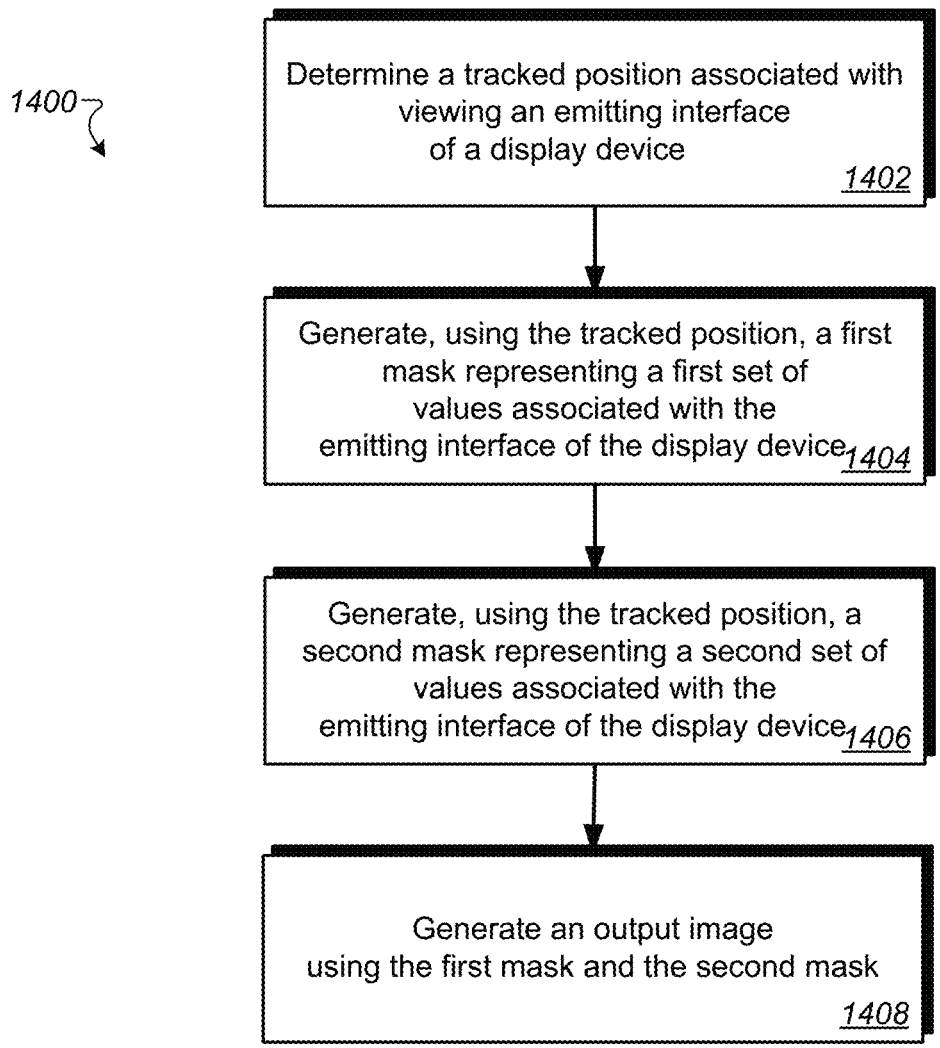
FIG. 14 is a flow chart diagramming one embodiment of a process to generate stereo weaved image content, according to implementations described throughout this disclosure.

FIG. 14 is a flow chart diagramming one embodiment of a process 1400 to generate stereo weaved image content. In general, the process 1400 may be carried out by one or more processors on a system communicatively coupled to a display device 202, for example. In some implementations, the one or more processors may be within device 202. In some implementations, the one or more processors may be external to device 202 and may communicate with display 202 to provide imaging on a screen of display 202.

The display associated with process 1400 may be a high-resolution display with a lenticular array of lenses coupled to the front of the display. A user may be viewing image content provided on display 202. The process 1400 may ensure that the left eye views for the user includes certain pixels while the right eye views for the user includes a mutually exclusive subset of pixels. The process 1400 may generate an output image using masks (e.g., mask images) that may be used to stereographically weave a left image and a right image together. For example, process 1400 may obtain a left image and a right image and interleave the pixels in such a way (according to mask images) so as to enable the user's left eye views the left image and the user's right eye views the right image, when viewed through the lenticular array coupled to the display 202.

At block 1402, the process 1400 can include determining a tracked position associated with viewing an emitting interface of a display device. For example, the tracking system 230 may determine a location associated with a user that is viewing device 202, for example. That is, the tracking system 230 may determine a head position or eye gaze of the user. In some implementations, the physical location of other parts of the user may be tracked and used by system 200 in order to provide image content structured for both the left eye and the right eye of the user viewing the display 202.

At block 1404, the process 1400 includes generating, using the tracked position of the user, a first mask representing a first set of values associated with the emitting interface of the display device. For example, the system 200 can use mask generation algorithms 224 to determine a left mask associated with viewing images by a left eye of the user viewing display 202. The first mask (e.g., a left mask 206A) may be computed using processors and algorithms as described herein. The left mask 206A may include a value for each RGB subpixel 212 corresponding to a particular image 204. The left mask 206A may be used as a left eye assignment function.

At block 1406, the process 1400 includes generating, using the tracked position, a second mask representing a second set of values associated with the emitting interface of the display device. For example, the system 200 can use mask generation algorithms 224 to determine a right mask associated with viewing images by a right eye of the user viewing display 202. The second mask (e.g., a right mask 206B) may be computed using processors and algorithms as described herein. The right mask 206B may include a value for each RGB subpixel 214 corresponding to a particular image 204. The right mask 206B may be used as a right eye assignment function.

In some implementations, the left mask 206A and the right mask 206B are derived from topographical 4D surfaces with plotted lines representing locations of light projected through a plurality of lenticular lenses associated with the emitting interface of the display device 202. For example, the masks may operate as topographical contour maps to map the locations of the lenticulars associated with display 202 and an image being provided on display 202. The first mask 206A and the second mask 206B may be generated by applying a non-linear mapping to fractional portions of the surfaces.

In some implementations, the first mask 206A represents a first sampled portion of pixels for a detected head position of a user viewing the display device 202 and the second mask 206B represents a second sampled portion of pixels for the detected head position of the user. For example, each mask may be calculated for a particular eye to view different respective portions of images displayed on display 202. In some implementations, the first mask 206A and the second mask 206B are used to obtain, for a plurality of changeable head positions of the user, a value for each pixel associated with the display device 202.

In some implementations, the tracked position is a head position of a user viewing display 202 and the first mask (e.g., left mask 206A) and the second mask (e.g., right mask 206B) are updated based on a detected movement of the head position. In some implementations, the tracked position varies for each row of the display device, as described in detail in the description of FIG. 15.

In some implementations, at least a portion of the first set of pixels is viewable from a first location that is associated with a left eye of a user viewing the display device 202. Similarly, at least a portion of the second set of pixels is viewable from a second location associated with a right eye of the user viewing the display device 202.

At block 1408, the process 1400 includes generating an output image 226 using the first mask (e.g., left mask 206A) and the second mask (e.g., right mask 206B). Generating the output image 226 may include obtaining a left image 216 with a first set of pixels and a right image with a second set of pixels representing subpixels 212 and subpixels 214, respectively. For example, processor 220 may request and/or obtain any portion of pixels from images 204 for use in generating left image 216 and right image 218.

Next, the process 1400 may include assigning the first set of values (from the calculated left mask 206A) to the first set of pixels in the left image 216 and assigning the second set of values (from the calculated right mask 206B) to the second set of pixels in the right image 218. The left image 216 and the right image 218 generated using left mask 206A and right mask 206B, respectively, may then be interleaved together according to the assigned first set of values and the assigned second set of values. In operation, the processor 220 may swizzle together the pixels of the left image 216 and the pixels of the right image 218 according to the left mask 206A and the right mask 206B.

The output image 226 may be provided to the display device. For example, the swizzled (i.e., stereo weaved) image may be provided by the processor 220 to the GPU 221. The GPU 221 may provide the output image to the autostereoscopic display 202 for display to the user tracked to the detected position. In general, the output image 226 may be configured to provide the left image 216 to the left eye of a user viewing the emitting interface of the display device 202 while simultaneously providing the right image 218 to a right eye of the user viewing the emitting interface of the display device 202.

In some implementations, the process 1400 may also include computing a color index for each of the first mask and the second mask. For example, a color index may be calculated for subpixels in RGB-L 212 and RGB-R 214. The process 1400 may determine, for each value in each of the first mask and the second mask, which of a red subpixel, a green subpixel, and a blue subpixel are to be indicated as illuminated in the respective masks. Indicated to be illuminated may refer to a value of one for a pixel or subpixel in the masks 206. In some implementations, the first mask (e.g., left mask 206A) and the second mask (e.g., right mask 206B) may include representations for at least one color index for each pixel of the display device. For example, the color index may add an additional dimension to the 2D structures described herein.

Figure 15:
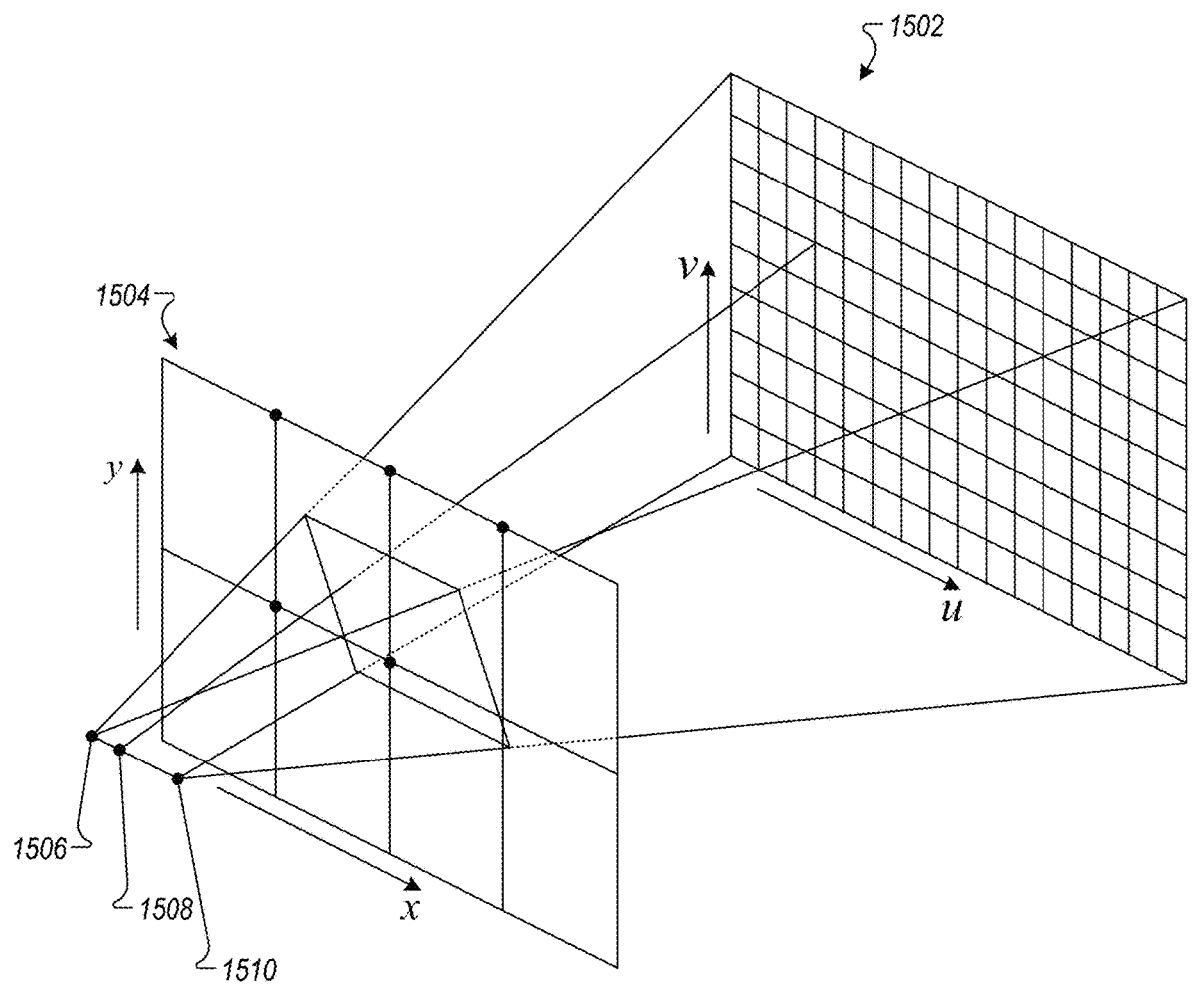
FIG. 15 is an example technique for determining masks based on each row a lenticular display, according to implementations described throughout this disclosure.

FIG. 15 is an example technique for determining masks based on each row a lenticular display. A u-v grid 1502 represents a display screen for display 202. An x-y grid 1504 represents a location a predetermined distance from the screen of display 202. A user may move from a position 1506 to a position 1508 to a position 1510 and/or to another position. The system 200 may calculate images and masks that can provide proper 3D image content to the moving user.

In general, a lenticular display, such as autostereoscopic display 202 may receive and display output images. For example, output images 226 that are provided to display 202 may be updated for display by one row of pixels at a time. Accordingly, for one rendered frame of content, different rows may be provided on the screen of display 202 at slightly different times. If the user is moving, the location of the head of the user may be different for different rows of the frame of content being displayed. The system 200 may account for the differences in display time. For example, as described above, a 17×10 image s[U, V] may be determined. The image may be sent to the GPU 221. However, when calculating the image s[U, V], the system 200 may allow the head position to vary with each row v display 202. The amount of computations remains the same, but with each computation, the head position is updated after calculating a row of s[U, V]. For example, a head position of the user may be updated if the user is determined to have moved, which may be more often than a rate at which a particular image frame is rendered and/or updated. Each new row of s[U,V] may potentially use a different head position.

Figure 16:
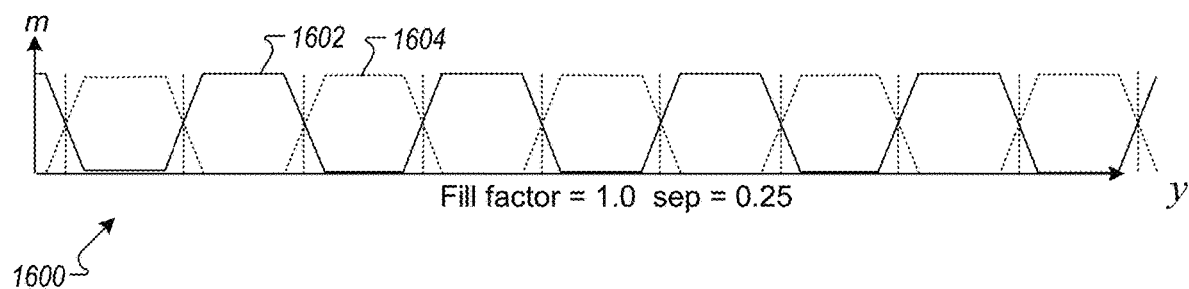
FIG. 16 illustrates an example function that weaves together a left image and a right image to generate stereo weaved image content, according to implementations described throughout this disclosure.

FIG. 16 illustrates an example function 1600 that weaves together a left image and a right image to generate stereo weaved image content. In this example, the left eye function 1602 is weaved together with the right eye function 1604. The fill factor is 1.0 with a separation of 0.25. This function enables the left mask 206A and the right mask 206B to sum to 1.0.

Figure 17:
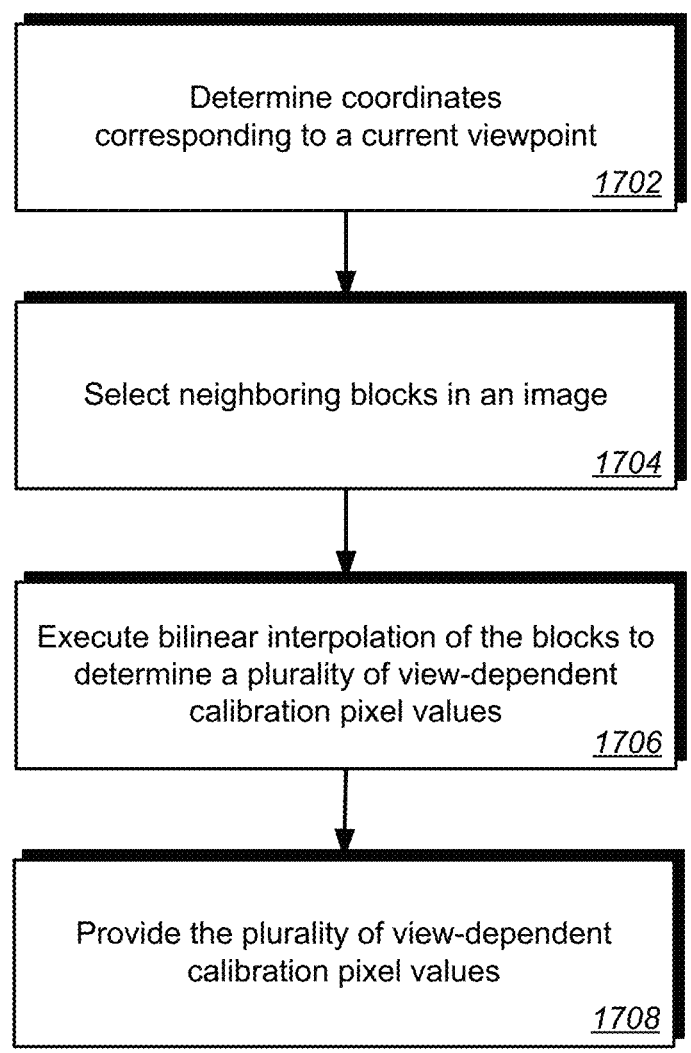
FIG. 17 is a flow chart diagramming one example of a process to use a look up table to determine view-dependent pixel values based on determined head positions, according to implementations described throughout this disclosure.

FIG. 17 is a flow chart diagramming one example of a process 1700 to use a look up table to determine view-dependent pixel values based on determined head positions. In short, the process 1700 may provide an example of using values in a lookup table to find surface s of computed pixel values and to do so after a head position (or change in head position) is determined.

At block 1702, the process 1700 includes determining coordinates corresponding to a current viewpoint. For example, the system 200 can utilize tracking system 230 to determine a head position for the user. From the head position, a normalized set of coordinates corresponding to the current viewpoint may be calculated.

At block 1704, the process 1700 includes selecting neighboring blocks in an image. For example, four neighboring blocks of a particular calibration image can be selected. For a specific image, four corner locations can be selected, as described with respect to FIG. 9 and locations 912, 914, 916, and 918.

At block 1706, the process 1700 may include executing a bilinear interpolation of the neighboring blocks to determine a plurality of view-dependent calibration pixel values. For example, using the values at corners 912-918 shown in FIG. 9, the system 200 may interpolate calibration pixels. In this example, s[3, 6] can be calculated at each respect corner 912-918 and may be equivalent to 0.4×0.7×S[3, 6, 1, 1]+0.6×0.7×S[3, 6, 2, 1]+0.4×0.3×S[3, 6, 1, 2]+0.6×0.3×S[3, 6, 2, 2].

At block 1708, the process 1700 may include providing the plurality of view-dependent calibration pixel values. The plurality of view-dependent calibration pixel values may correspond to the determined head position. Each time a head position changes, the system 200 may re-determine calibration pixel values for the changed head position and provide the new calibration pixel values for use in generating new output images for display to the user.

In some implementations, the systems and techniques described herein may be used to represent a mask image as a 4D surface. The 4D surface may be generated and used with a non-linear mapping applied to fractional parts of the surface to produce a mask for assigning pixels in images to either a left eye or a right eye. The mask may be calculated based on a head position of a user viewing the display depicting image content.

In some implementations, additional surfaces may be added and utilized with the systems described herein to, for example, cancel or eliminate crosstalk because crosstalk may change as the viewing angle associated with the user and any imagery changes. The system may additional perform backlight uniformity correction can be performed using such surface representations because backlight uniformity may change with position on a display screen and with the viewing angle.

Figure 18:
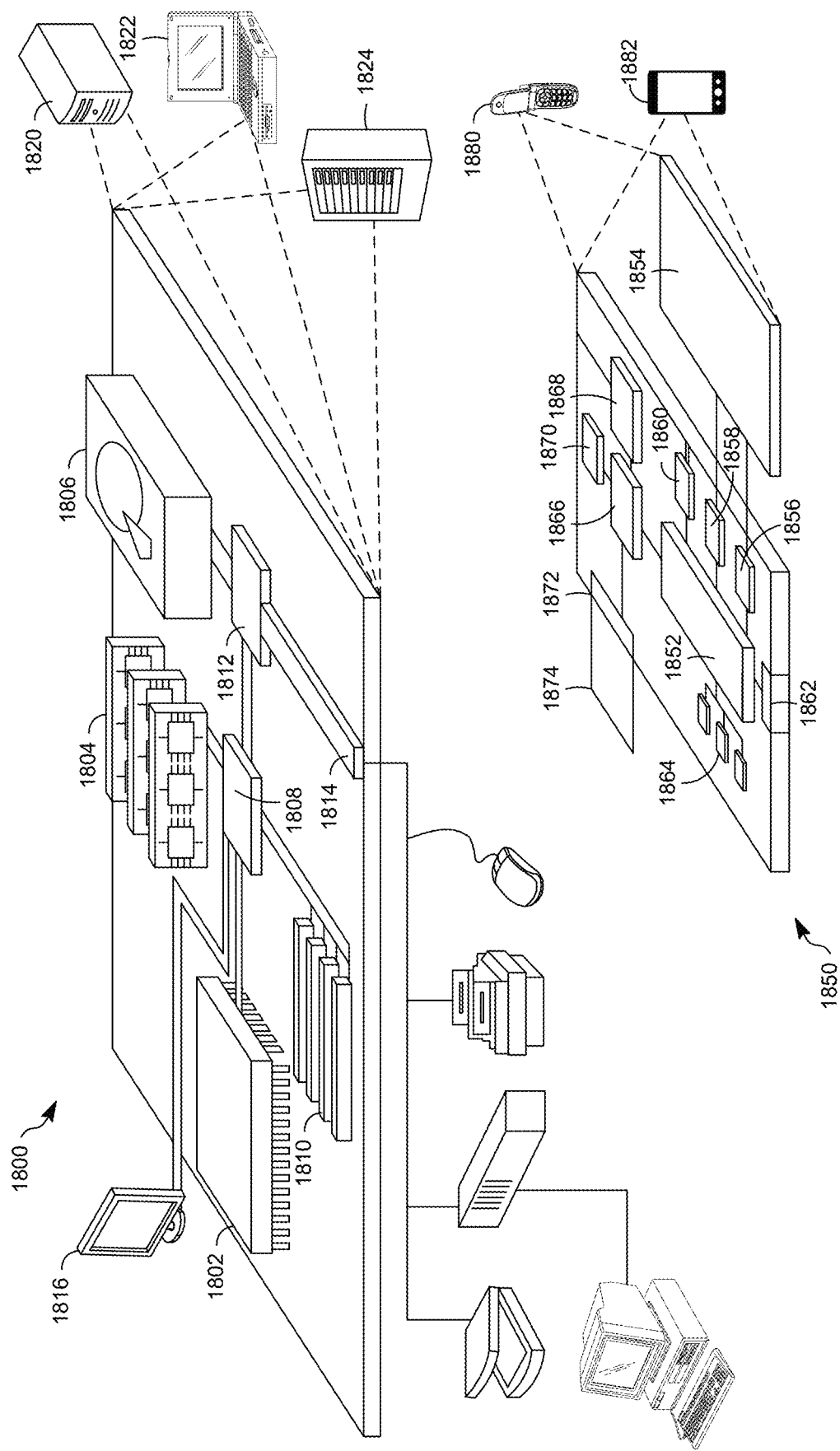
FIG. 18 shows an example of a generic computer device and a generic mobile computer device, which may be used with the techniques described herein.

FIG. 18 shows an example of a generic computer device 1800 and a generic mobile computer device 1850, which may be used with the techniques described herein. Computing device 1800 is intended to represent various forms of digital computers, such as laptops, desktops, tablets, workstations, personal digital assistants, televisions, servers, blade servers, mainframes, and other appropriate computing devices. Computing device 1850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1800 includes a processor 1802, memory 1804, a storage device 1806, a high-speed interface 1808 connecting to memory 1804 and high-speed expansion ports 1810, and a low speed interface 1812 connecting to low speed bus 1814 and storage device 1806. The processor 1802 can be a semiconductor-based processor. The memory 1804 can be a semiconductor-based memory. Each of the components 1802, 1804, 1806, 1808, 1810, and 1812, are interconnected using various busses, and may be mounted on a common motherboard or in other manners as appropriate. The processor 1802 can process instructions for execution within the computing device 1800, including instructions stored in the memory 1804 or on the storage device 1806 to display graphical information for a GUI on an external input/output device, such as display 1816 coupled to high speed interface 1808. In other implementations, multiple processors and/or multiple buses may be used, as appropriate, along with multiple memories and types of memory. Also, multiple computing devices 1800 may be connected, with each device providing portions of the necessary operations (e.g., as a server bank, a group of blade servers, or a multi-processor system).

The memory 1804 stores information within the computing device 1800. In one implementation, the memory 1804 is a volatile memory unit or units. In another implementation, the memory 1804 is a non-volatile memory unit or units. The memory 1804 may also be another form of computer-readable medium, such as a magnetic or optical disk.

The storage device 1806 is capable of providing mass storage for the computing device 1800. In one implementation, the storage device 1806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1804, the storage device 1806, or memory on processor 1802.

The high speed controller 1808 manages bandwidth-intensive operations for the computing device 1800, while the low speed controller 1812 manages lower bandwidth-intensive operations. Such allocation of functions is exemplary only. In one implementation, the high-speed controller 1808 is coupled to memory 1804, display 1816 (e.g., through a graphics processor or accelerator), and to high-speed expansion ports 1810, which may accept various expansion cards (not shown). In the implementation, low-speed controller 1812 is coupled to storage device 1806 and low-speed expansion port 1814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1800 may be implemented in a number of different forms, as shown in the figure. For example, it may be implemented as a standard server 1820, or multiple times in a group of such servers. It may also be implemented as part of a rack server system 1824. In addition, it may be implemented in a personal computer such as a laptop computer 1822. Alternatively, components from computing device 1800 may be combined with other components in a mobile device (not shown), such as device 1850. Each of such devices may contain one or more of computing device 1800, 1850, and an entire system may be made up of multiple computing devices 1800, 1850 communicating with each other.

Computing device 1850 includes a processor 1852, memory 1864, an input/output device such as a display 1854, a communication interface 1866, and a transceiver 1868, among other components. The device 1850 may also be provided with a storage device, such as a microdrive or other device, to provide additional storage. Each of the components 1850, 1852, 1864, 1854, 1866, and 1868, are interconnected using various buses, and several of the components may be mounted on a common motherboard or in other manners as appropriate.

The processor 1852 can execute instructions within the computing device 1850, including instructions stored in the memory 1864. The processor may be implemented as a chipset of chips that include separate and multiple analog and digital processors. The processor may provide, for example, for coordination of the other components of the device 1850, such as control of user interfaces, applications run by device 1850, and wireless communication by device 1850.

Processor 1852 may communicate with a user through control interface 1858 and display interface 1856 coupled to a display 1854. The display 1854 may be, for example, a TFT LCD (Thin-Film-Transistor Liquid Crystal Display) or an OLED (Organic Light Emitting Diode) display, or other appropriate display technology. The display interface 1856 may comprise appropriate circuitry for driving the display 1854 to present graphical and other information to a user. The control interface 1858 may receive commands from a user and convert them for submission to the processor 1852. In addition, an external interface 1862 may be provided in communication with processor 1852, so as to enable near area communication of device 1850 with other devices. External interface 1862 may provide, for example, for wired communication in some implementations, or for wireless communication in other implementations, and multiple interfaces may also be used.

The memory 1864 stores information within the computing device 1850. The memory 1864 can be implemented as one or more of a computer-readable medium or media, a volatile memory unit or units, or a non-volatile memory unit or units. Expansion memory 1874 may also be provided and connected to device 1850 through expansion interface 1872, which may include, for example, a SIMM (Single In Line Memory Module) card interface. Such expansion memory 1874 may provide extra storage space for device 1850, or may also store applications or other information for device 1850. Specifically, expansion memory 1874 may include instructions to carry out or supplement the processes described above, and may include secure information also. Thus, for example, expansion memory 1874 may be provided as a security module for device 1850, and may be programmed with instructions that permit secure use of device 1850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1864, expansion memory 1874, or memory on processor 1852, that may be received, for example, over transceiver 1868 or external interface 1862.

Device 1850 may communicate wirelessly through communication interface 1866, which may include digital signal processing circuitry where necessary. Communication interface 1866 may provide for communications under various modes or protocols, such as GSM voice calls, SMS, EMS, or MMS messaging, CDMA, TDMA, PDC, WCDMA, CDMA1800, or GPRS, among others. Such communication may occur, for example, through radio-frequency transceiver 1868. In addition, short-range communication may occur, such as using a Bluetooth, WiFi, or other such transceiver (not shown). In addition, GPS (Global Positioning System) receiver module 1870 may provide additional navigation- and location-related wireless data to device 1850, which may be used as appropriate by applications running on device 1850.

Device 1850 may also communicate audibly using audio codec 1860, which may receive spoken information from a user and convert it to usable digital information. Audio codec 1860 may likewise generate audible sound for a user, such as through a speaker, e.g., in a handset of device 1850. Such sound may include sound from voice telephone calls, may include recorded sound (e.g., voice messages, music files, etc.) and may also include sound generated by applications operating on device 1850.

The computing device 1850 may be implemented in a number of different forms, as shown in the figure. For example, it may be implemented as a cellular telephone 1880. It may also be implemented as part of a smart phone 1882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
    determining a tracked position of a user associated with viewing an emitting interface of a display device;
    generating, using the tracked position, a first mask representing a first set of values associated with the emitting interface of the display device;
    generating, using the tracked position, a second mask representing a second set of values associated with the emitting interface of the display device;
    wherein the first mask and the second mask are derived from a grid representing a sample of pixel values of the emitting interface of the display device based on a predefined distance from the emitting interface of the display device, wherein pixel values are determined for a plurality of pixels on the emitting interface of the display device and for a plurality of changeable head positions of the user by interpolation of the grid; and
    generating an output image using the first mask and the second mask, the generating of the output image including:
        obtaining a left image with a first set of pixels and a right image with a second set of pixels,
        assigning the first set of values to the first set of pixels in the left image,
        assigning the second set of values to the second set of pixels in the right image, and
        interleaving the left image with the right image according to the assigned first set of values and the assigned second set of values.

2. The method of claim 1, wherein:
    providing the output image to the display device, the output image being configured to provide the left image to a left eye of a user viewing the emitting interface of the display device while simultaneously providing the right image to a right eye of the user viewing the emitting interface of the display device.

3. The method of claim 1, wherein:
    the first mask represents a first subset of pixels for a detected head position of a user viewing the display device;
    the second mask represents a second subset of pixels for the detected head position of the user; and
    the first mask and the second mask are used to obtain, for a plurality of changeable head positions of the user, a value for each pixel associated with the display device.

4. The method of claim 1, wherein the first mask and the second mask are color images having red, green, and blue color components, each color component is used to determine a respective color component of the output image.

5. The method of claim 1, wherein the tracked position is a head position of a user and wherein the first mask and the second mask are updated based on a detected movement of the head position.

6. The method of claim 1, wherein the first mask and the second mask include representations for at least one color index for each pixel of the display device.

7. The method of claim 1, wherein the tracked position varies for each row of the display device.

8. A system, comprising:
 at least one computing device including,
  a memory storing executable instructions; and
  a processor configured to execute the instructions, to cause the at least one computing device to:
   determine a tracked position of a user associated with viewing an emitting interface of a display device;
   generate, using the tracked position, a first mask representing a first set of values associated with the emitting interface of the display device;
   generate, using the tracked position, a second mask representing a second set of values associated with the emitting interface of the display device;
   wherein the first mask and the second mask are derived from a grid representing a sample of pixel values of the emitting interface of the display device based on a predefined distance from the emitting interface of the display device, wherein pixel values are determined for a plurality of pixels on the emitting interface of the display device and for a plurality of changeable head positions of the user by interpolation of the grid; and
   obtain a left eye image with a first set of pixels;
   obtain a right eye image with a second set of pixels;
   assign the first set of values to the first set of pixels;
   assign the second set of values to the second set of pixels; and
  generate an output image, the output image being generated by interleaving the left eye image and the right eye image according to the assigned first set of values and the assigned second set of values.

9. The system of claim 8, wherein:
 at least a portion of the first set of pixels is viewable from a first location and the first location is associated with a left eye of a user viewing the display device; and
 at least a portion of the second set of pixels is viewable from a second location and the second location is associated with a right eye of the user viewing the display device.

10. The system of claim 8, wherein:
 the first mask represents a first subset of pixels for a detected head position of a user viewing the display device;
 the second mask represents a second subset of pixels for the detected head position of the user; and
 the first mask and the second mask are used to obtain, for the plurality of changeable head positions of the user, a value for each pixel associated with the display device.

11. The system of claim 8, wherein the first mask and the second mask are color images having red, green, and blue color components, each color component is used to determine a respective color component of the output image.

12. The system of claim 8, wherein the first mask and the second mask include representations for at least one color index for each pixel of the display device.

13. A display device system, comprising:
 a tracking module;
 a display panel coupled to a lenticular lens array;
 at least one processing device; and
 a memory storing instructions that when executed cause the system to perform operations including:
  determining a tracked position of a user associated with viewing an emitting interface of a display device;
  generating, using the tracked position, a first mask representing a first set of values associated with the emitting interface of the display device,
  generating, using the tracked position, a second mask representing a second set of values associated with the emitting interface of the display device;
  wherein the first mask and the second mask are derived from a grid representing a sample of pixel values of the emitting interface of the display device based on a predefined distance from the emitting interface of the display device, wherein pixel values are determined for a plurality of pixels on the emitting interface of the display device and for a plurality of head positions of the user by interpolation of the grid; and
  generating an output image using the first mask and the second mask, the generating of the output image including:
   obtaining a left image with a first set of pixels and a right image with a second set of pixels,
   assigning the first set of values to the first set of pixels in the left image,
   assigning the second set of values to the second set of pixels in the right image, and
   interleaving the left image with the right image according to the assigned first set of values and the assigned second set of values.

14. The system of claim 13, wherein:
 providing the output image to the display device, the output image being configured to provide the left image to a left eye of a user viewing the emitting interface of the display device while simultaneously providing the right image to a right eye of the user viewing the emitting interface of the display device.

15. The system of claim 13, wherein the first mask and the second mask are color images having red, green, and blue color components, each color component is used to determine a respective color component of the output image.

16. The system of claim 13, wherein the tracked position varies for each row of the display device.

17. The method of claim 1, wherein:
 generating the first mask includes applying a non-linear function to map fractional parts of the emitting interface of the display device to determine the assignment of the first set of values to the first set of pixels in the left image; and
 generating the second mask includes applying the non-linear function to map different fractional parts of the emitting interface of the display device to determine the assignment of the second set of values to the second set of pixels in the right image.

18. The method of claim 1, wherein the grid is defined by four corner locations retrieved from a 4D lookup table including samples of the emitting interface of the display device.

19. The method of claim 1, wherein:
 the tracked position represents at least one detected head position of the user viewing the display device; and
 the grid represents the sample of pixel values of the emitting interface of the display device sampled from the detected head position.

20. The method of claim 19, wherein the interpolation of the grid is performed using bilinear interpolation based on the at least one detected head position to determine pixel values that are visible from the at least one detected head position.

* * * * *